US011314859B1

(12) United States Patent
Singh et al.

(10) Patent No.: US 11,314,859 B1
(45) Date of Patent: Apr. 26, 2022

(54) CYBER-SECURITY SYSTEM AND METHOD FOR DETECTING ESCALATION OF PRIVILEGES WITHIN AN ACCESS TOKEN

(71) Applicant: FireEye, Inc., Milpitas, CA (US)

(72) Inventors: Japneet Singh, Bangalore (IN); Ratnesh Pandey, Allahabad (IN); Atul Kabra, Bangalore (IN)

(73) Assignee: FireEye Security Holdings, Inc., Milpitas, CA (US)

( * ) Notice: Subject to any disclaimer, the term of this patent is extended or adjusted under 35 U.S.C. 154(b) by 386 days.

(21) Appl. No.: 16/353,984

(22) Filed: Mar. 14, 2019

Related U.S. Application Data

(60) Provisional application No. 62/690,835, filed on Jun. 27, 2018.

(51) Int. Cl.
*H04L 9/32* (2006.01)
*G06F 21/55* (2013.01)
(Continued)

(52) U.S. Cl.
CPC ............ *G06F 21/554* (2013.01); *G06F 21/56* (2013.01); *G06F 21/604* (2013.01); *G06F 21/62* (2013.01); *H04L 9/3213* (2013.01); *H04L 63/102* (2013.01)

(58) Field of Classification Search
CPC ........ G06F 21/554; G06F 21/62; G06F 21/56; G06F 21/604; H04L 9/3213; H04L 63/102
(Continued)

(56) References Cited

U.S. PATENT DOCUMENTS

| 4,292,580 A | 9/1981 | Ott et al. |
| 5,175,732 A | 12/1992 | Hendel et al. |

(Continued)

FOREIGN PATENT DOCUMENTS

| GB | 2439806 A | 1/2008 |
| GB | 2490431 A | 10/2012 |

(Continued)

OTHER PUBLICATIONS

Venezia, Paul, "NetDetector Captures Intrusions", InfoWorld Issue 27, ("Venezia"), (Jul. 14, 2003).
(Continued)

*Primary Examiner* — Jeffrey C Pwu
*Assistant Examiner* — Nega Woldemariam
(74) *Attorney, Agent, or Firm* — Rutan & Tucker, LLP

(57) ABSTRACT

According to one embodiment, a method detecting and mitigating a privilege escalation attack on an electronic device is described. The method involves operations by a user agent mode operating within a user space and a kernel driver mode operating within a kernel space. The kernel driver mode, in response to detecting an initial activation of a process being monitored, stores metadata associated with an access token. This metadata includes the initial token state information. Responsive to detecting an event associated with the process being monitored, the kernel mode driver extracts a portion of current state information for the access token for comparison to a portion of the stored token state information. Differences between content within the current state information and the stored token state information are used, at least in part, by the user agent mode to detect a privilege escalation attack.

27 Claims, 5 Drawing Sheets

(51) Int. Cl.
  *G06F 21/56* (2013.01)
  *G06F 21/60* (2013.01)
  *H04L 29/06* (2006.01)
  *G06F 21/62* (2013.01)
(58) Field of Classification Search
  USPC .......................................................... 726/27
  See application file for complete search history.

(56) References Cited

U.S. PATENT DOCUMENTS

| | | | |
|---|---|---|---|
| 5,319,776 A | 6/1994 | Hile et al. |
| 5,440,723 A | 8/1995 | Arnold et al. |
| 5,490,249 A | 2/1996 | Miller |
| 5,657,473 A | 8/1997 | Killean et al. |
| 5,802,277 A | 9/1998 | Cowland |
| 5,842,002 A | 11/1998 | Schnurer et al. |
| 5,960,170 A | 9/1999 | Chen et al. |
| 5,978,917 A | 11/1999 | Chi |
| 5,983,348 A | 11/1999 | Ji |
| 6,088,803 A | 7/2000 | Tso et al. |
| 6,092,194 A | 7/2000 | Touboul |
| 6,094,677 A | 7/2000 | Capek et al. |
| 6,108,799 A | 8/2000 | Boulay et al. |
| 6,154,844 A | 11/2000 | Touboul et al. |
| 6,269,330 B1 | 7/2001 | Cidon et al. |
| 6,272,641 B1 | 8/2001 | Ji |
| 6,279,113 B1 | 8/2001 | Vaidya |
| 6,298,445 B1 | 10/2001 | Shostack et al. |
| 6,357,008 B1 | 3/2002 | Nachenberg |
| 6,424,627 B1 | 7/2002 | Sorhaug et al. |
| 6,442,696 B1 | 8/2002 | Wray et al. |
| 6,484,315 B1 | 11/2002 | Ziese |
| 6,487,666 B1 | 11/2002 | Shanklin et al. |
| 6,493,756 B1 | 12/2002 | O'Brien et al. |
| 6,550,012 B1 | 4/2003 | Villa et al. |
| 6,775,657 B1 | 8/2004 | Baker |
| 6,831,893 B1 | 12/2004 | Ben Nun et al. |
| 6,832,367 B1 | 12/2004 | Choi et al. |
| 6,895,550 B2 | 5/2005 | Kanchirayappa et al. |
| 6,898,632 B2 | 5/2005 | Gordy et al. |
| 6,907,396 B1 | 6/2005 | Muttik et al. |
| 6,941,348 B2 | 9/2005 | Petry |
| 6,971,097 B1 | 11/2005 | Wallman |
| 6,981,279 B1 | 12/2005 | Arnold et al. |
| 7,007,107 B1 | 2/2006 | Ivchenko et al. |
| 7,028,179 B2 | 4/2006 | Anderson et al. |
| 7,043,757 B2 | 5/2006 | Hoefelmeyer et al. |
| 7,058,822 B2 | 6/2006 | Edery et al. |
| 7,069,316 B1 | 6/2006 | Gryaznov |
| 7,080,407 B1 | 7/2006 | Zhao et al. |
| 7,080,408 B1 | 7/2006 | Pak et al. |
| 7,093,002 B2 | 8/2006 | Wolff et al. |
| 7,093,239 B1 | 8/2006 | van der Made |
| 7,096,498 B2 | 8/2006 | Judge |
| 7,100,201 B2 | 8/2006 | Izatt |
| 7,107,617 B2 | 9/2006 | Hursey et al. |
| 7,159,149 B2 | 1/2007 | Spiegel et al. |
| 7,213,260 B2 | 5/2007 | Judge |
| 7,231,667 B2 | 6/2007 | Jordan |
| 7,240,364 B1 | 7/2007 | Branscomb et al. |
| 7,240,368 B1 | 7/2007 | Roesch et al. |
| 7,243,371 B1 | 7/2007 | Kasper et al. |
| 7,249,175 B1 | 7/2007 | Donaldson |
| 7,287,278 B2 | 10/2007 | Liang |
| 7,308,716 B2 | 12/2007 | Danford et al. |
| 7,328,453 B2 | 2/2008 | Merkle, Jr. et al. |
| 7,346,486 B2 | 3/2008 | Ivancic et al. |
| 7,356,736 B2 | 4/2008 | Natvig |
| 7,386,888 B2 | 6/2008 | Liang et al. |
| 7,392,542 B2 | 6/2008 | Bucher |
| 7,418,729 B2 | 8/2008 | Szor |
| 7,428,300 B1 | 9/2008 | Drew et al. |
| 7,441,272 B2 | 10/2008 | Durham et al. |
| 7,448,084 B1 | 11/2008 | Apap et al. |
| 7,458,098 B2 | 11/2008 | Judge et al. |
| 7,464,404 B2 | 12/2008 | Carpenter et al. |
| 7,464,407 B2 | 12/2008 | Nakae et al. |
| 7,467,408 B1 | 12/2008 | O'Toole, Jr. |
| 7,478,428 B1 | 1/2009 | Thomlinson |
| 7,480,773 B1 | 1/2009 | Reed |
| 7,487,543 B2 | 2/2009 | Arnold et al. |
| 7,496,960 B1 | 2/2009 | Chen et al. |
| 7,496,961 B2 | 2/2009 | Zimmer et al. |
| 7,519,990 B1 | 4/2009 | Xie |
| 7,523,493 B2 | 4/2009 | Liang et al. |
| 7,530,104 B1 | 5/2009 | Thrower et al. |
| 7,540,025 B2 | 5/2009 | Tzadikario |
| 7,546,638 B2 | 6/2009 | Anderson et al. |
| 7,565,550 B2 | 7/2009 | Liang et al. |
| 7,568,233 B1 | 7/2009 | Szor et al. |
| 7,584,455 B2 | 9/2009 | Ball |
| 7,603,715 B2 | 10/2009 | Costa et al. |
| 7,607,171 B1 | 10/2009 | Marsden et al. |
| 7,639,714 B2 | 12/2009 | Stolfo et al. |
| 7,644,441 B2 | 1/2010 | Schmid et al. |
| 7,657,419 B2 | 2/2010 | van der Made |
| 7,676,841 B2 | 3/2010 | Sobchuk et al. |
| 7,698,548 B2 | 4/2010 | Shelest et al. |
| 7,707,633 B2 | 4/2010 | Danford et al. |
| 7,712,136 B2 | 5/2010 | Sprosts et al. |
| 7,730,011 B1 | 6/2010 | Deninger et al. |
| 7,739,740 B1 | 6/2010 | Nachenberg et al. |
| 7,779,463 B2 | 8/2010 | Stolfo et al. |
| 7,784,097 B1 | 8/2010 | Stolfo et al. |
| 7,832,008 B1 | 11/2010 | Kraemer |
| 7,836,502 B1 | 11/2010 | Zhao et al. |
| 7,849,506 B1 | 12/2010 | Dansey et al. |
| 7,854,007 B2 | 12/2010 | Sprosts et al. |
| 7,869,073 B2 | 1/2011 | Oshima |
| 7,877,803 B2 | 1/2011 | Enstone et al. |
| 7,904,959 B2 | 3/2011 | Sidiroglou et al. |
| 7,908,660 B2 | 3/2011 | Bahl |
| 7,930,738 B1 | 4/2011 | Petersen |
| 7,937,387 B2 | 5/2011 | Frazier et al. |
| 7,937,761 B1 | 5/2011 | Bennett |
| 7,949,849 B2 | 5/2011 | Lowe et al. |
| 7,996,556 B2 | 8/2011 | Raghavan et al. |
| 7,996,836 B1 | 8/2011 | McCorkendale et al. |
| 7,996,904 B1 | 8/2011 | Chiueh et al. |
| 7,996,905 B2 | 8/2011 | Arnold et al. |
| 8,006,305 B2 | 8/2011 | Aziz |
| 8,010,667 B2 | 8/2011 | Zhang et al. |
| 8,020,206 B2 | 9/2011 | Hubbard et al. |
| 8,028,338 B1 | 9/2011 | Schneider et al. |
| 8,042,184 B1 | 10/2011 | Batenin |
| 8,045,094 B2 | 10/2011 | Teragawa |
| 8,045,458 B2 | 10/2011 | Alperovitch et al. |
| 8,069,484 B2 | 11/2011 | McMillan et al. |
| 8,087,086 B1 | 12/2011 | Lai et al. |
| 8,171,553 B2 | 5/2012 | Aziz et al. |
| 8,176,049 B2 | 5/2012 | Deninger et al. |
| 8,176,480 B1 | 5/2012 | Spertus |
| 8,201,246 B1 | 6/2012 | Wu et al. |
| 8,204,984 B1 | 6/2012 | Aziz et al. |
| 8,214,905 B1 | 7/2012 | Doukhvalov et al. |
| 8,220,055 B1 | 7/2012 | Kennedy |
| 8,225,288 B2 | 7/2012 | Miller et al. |
| 8,225,373 B2 | 7/2012 | Kraemer |
| 8,233,882 B2 | 7/2012 | Rogel |
| 8,234,640 B1 | 7/2012 | Fitzgerald et al. |
| 8,234,709 B2 | 7/2012 | Viljoen et al. |
| 8,239,944 B1 | 8/2012 | Nachenberg et al. |
| 8,260,914 B1 | 9/2012 | Ranjan |
| 8,266,091 B1 | 9/2012 | Gubin et al. |
| 8,286,251 B2 | 10/2012 | Eker et al. |
| 8,291,499 B2 | 10/2012 | Aziz et al. |
| 8,307,435 B1 | 11/2012 | Mann et al. |
| 8,307,443 B1 | 11/2012 | Wang et al. |
| 8,312,545 B2 | 11/2012 | Fuvell et al. |
| 8,321,936 B1 | 11/2012 | Green et al. |
| 8,321,941 B2 | 11/2012 | Fuvell et al. |
| 8,332,571 B1 | 12/2012 | Edwards, Sr. |
| 8,365,286 B2 | 1/2013 | Poston |

(56) References Cited

U.S. PATENT DOCUMENTS

| | | |
|---|---|---|
| 8,365,297 B1 | 1/2013 | Parshin et al. |
| 8,370,938 B1 | 2/2013 | Daswani et al. |
| 8,370,939 B2 | 2/2013 | Zaitsev et al. |
| 8,375,444 B2 | 2/2013 | Aziz et al. |
| 8,381,299 B2 | 2/2013 | Stolfo et al. |
| 8,402,529 B1 | 3/2013 | Green et al. |
| 8,464,340 B2 | 6/2013 | Ahn et al. |
| 8,479,174 B2 | 7/2013 | Chiriac |
| 8,479,276 B1 | 7/2013 | Vaystikh et al. |
| 8,479,291 B1 | 7/2013 | Bodke |
| 8,510,827 B1 | 8/2013 | Leake et al. |
| 8,510,828 B1 | 8/2013 | Guo et al. |
| 8,510,842 B2 | 8/2013 | Amit et al. |
| 8,516,478 B1 | 8/2013 | Edwards et al. |
| 8,516,590 B1 | 8/2013 | Ranadive et al. |
| 8,516,593 B2 | 8/2013 | Aziz |
| 8,522,348 B2 | 8/2013 | Chen et al. |
| 8,528,086 B1 | 9/2013 | Aziz |
| 8,533,824 B2 | 9/2013 | Hutton et al. |
| 8,539,582 B1 | 9/2013 | Aziz et al. |
| 8,549,638 B2 | 10/2013 | Aziz |
| 8,555,391 B1 | 10/2013 | Demir et al. |
| 8,561,177 B1 | 10/2013 | Aziz et al. |
| 8,566,476 B2 | 10/2013 | Shiffer et al. |
| 8,566,946 B1 | 10/2013 | Aziz et al. |
| 8,584,094 B2 | 11/2013 | Dadhia et al. |
| 8,584,234 B1 | 11/2013 | Sobel et al. |
| 8,584,239 B2 | 11/2013 | Aziz et al. |
| 8,595,834 B2 | 11/2013 | Xie et al. |
| 8,627,476 B1 | 1/2014 | Satish et al. |
| 8,635,696 B1 | 1/2014 | Aziz |
| 8,682,054 B2 | 3/2014 | Xue et al. |
| 8,682,812 B1 | 3/2014 | Ranjan |
| 8,689,333 B2 | 4/2014 | Aziz |
| 8,695,096 B1 | 4/2014 | Zhang |
| 8,713,631 B1 | 4/2014 | Pavlyushchik |
| 8,713,681 B2 | 4/2014 | Silberman et al. |
| 8,726,392 B1 | 5/2014 | McCorkendale et al. |
| 8,739,280 B2 | 5/2014 | Chess et al. |
| 8,776,229 B1 | 7/2014 | Aziz |
| 8,782,792 B1 | 7/2014 | Bodke |
| 8,789,172 B2 | 7/2014 | Stolfo et al. |
| 8,789,178 B2 | 7/2014 | Kejriwal et al. |
| 8,793,278 B2 | 7/2014 | Frazier et al. |
| 8,793,787 B2 | 7/2014 | Ismael et al. |
| 8,805,947 B1 | 8/2014 | Kuzkin et al. |
| 8,806,647 B1 | 8/2014 | Daswani et al. |
| 8,832,829 B2 | 9/2014 | Manni et al. |
| 8,850,570 B1 | 9/2014 | Ramzan |
| 8,850,571 B2 | 9/2014 | Staniford et al. |
| 8,881,234 B2 | 11/2014 | Narasimhan et al. |
| 8,881,271 B2 | 11/2014 | Butler, II |
| 8,881,282 B1 | 11/2014 | Aziz et al. |
| 8,898,788 B1 | 11/2014 | Aziz et al. |
| 8,935,779 B2 | 1/2015 | Manni et al. |
| 8,949,257 B2 | 2/2015 | Shiffer et al. |
| 8,984,638 B1 | 3/2015 | Aziz et al. |
| 8,990,939 B2 | 3/2015 | Staniford et al. |
| 8,990,944 B1 | 3/2015 | Singh et al. |
| 8,997,219 B2 | 3/2015 | Staniford et al. |
| 9,009,822 B1 | 4/2015 | Ismael et al. |
| 9,009,823 B1 | 4/2015 | Ismael et al. |
| 9,027,135 B1 | 5/2015 | Aziz |
| 9,071,638 B1 | 6/2015 | Aziz et al. |
| 9,104,867 B1 | 8/2015 | Thioux et al. |
| 9,106,630 B2 | 8/2015 | Frazier et al. |
| 9,106,694 B2 | 8/2015 | Aziz et al. |
| 9,118,715 B2 | 8/2015 | Staniford et al. |
| 9,159,035 B1 | 10/2015 | Ismael et al. |
| 9,171,160 B2 | 10/2015 | Vincent et al. |
| 9,176,843 B1 | 11/2015 | Ismael et al. |
| 9,189,627 B1 | 11/2015 | Islam |
| 9,195,829 B1 | 11/2015 | Goradia et al. |
| 9,197,664 B1 | 11/2015 | Aziz et al. |
| 9,223,972 B1 | 12/2015 | Vincent et al. |
| 9,225,740 B1 | 12/2015 | Ismael et al. |
| 9,241,010 B1 | 1/2016 | Bennett et al. |
| 9,251,343 B1 | 2/2016 | Vincent et al. |
| 9,262,635 B2 | 2/2016 | Paithane et al. |
| 9,268,936 B2 | 2/2016 | Butler |
| 9,275,229 B2 | 3/2016 | LeMasters |
| 9,282,109 B1 | 3/2016 | Aziz et al. |
| 9,292,686 B2 | 3/2016 | Ismael et al. |
| 9,294,501 B2 | 3/2016 | Mesdaq et al. |
| 9,300,686 B2 | 3/2016 | Pidathala et al. |
| 9,306,960 B1 | 4/2016 | Aziz |
| 9,306,974 B1 | 4/2016 | Aziz et al. |
| 9,311,479 B1 | 4/2016 | Manni et al. |
| 9,355,247 B1 | 5/2016 | Thioux et al. |
| 9,356,944 B1 | 5/2016 | Aziz |
| 9,363,280 B1 | 6/2016 | Rivlin et al. |
| 9,367,681 B1 | 6/2016 | Ismael et al. |
| 9,398,028 B1 | 7/2016 | Karandikar et al. |
| 9,413,781 B2 | 8/2016 | Cunningham et al. |
| 9,426,071 B1 | 8/2016 | Caldejon et al. |
| 9,430,646 B1 | 8/2016 | Mushtaq et al. |
| 9,432,389 B1 | 8/2016 | Khalid et al. |
| 9,438,613 B1 | 9/2016 | Paithane et al. |
| 9,438,622 B1 | 9/2016 | Staniford et al. |
| 9,438,623 B1 | 9/2016 | Thioux et al. |
| 9,459,901 B2 | 10/2016 | Jung et al. |
| 9,467,460 B1 | 10/2016 | Otvagin et al. |
| 9,483,644 B1 | 11/2016 | Paithane et al. |
| 9,495,180 B2 | 11/2016 | Ismael |
| 9,497,213 B2 | 11/2016 | Thompson et al. |
| 9,507,935 B2 | 11/2016 | Ismael et al. |
| 9,516,057 B2 | 12/2016 | Aziz |
| 9,519,782 B2 | 12/2016 | Aziz et al. |
| 9,536,091 B2 | 1/2017 | Paithane et al. |
| 9,537,972 B1 | 1/2017 | Edwards et al. |
| 9,560,059 B1 | 1/2017 | Islam |
| 9,565,202 B1 | 2/2017 | Kindlund et al. |
| 9,591,015 B1 | 3/2017 | Amin et al. |
| 9,591,020 B1 | 3/2017 | Aziz |
| 9,594,904 B1 | 3/2017 | Jain et al. |
| 9,594,905 B1 | 3/2017 | Ismael et al. |
| 9,594,912 B1 | 3/2017 | Thioux et al. |
| 9,609,007 B1 | 3/2017 | Rivlin et al. |
| 9,626,509 B1 | 4/2017 | Khalid et al. |
| 9,628,498 B1 | 4/2017 | Aziz et al. |
| 9,628,507 B2 | 4/2017 | Haq et al. |
| 9,633,134 B2 | 4/2017 | Ross |
| 9,635,039 B1 | 4/2017 | Islam et al. |
| 9,641,546 B1 | 5/2017 | Manni et al. |
| 9,654,485 B1 | 5/2017 | Neumann |
| 9,661,009 B1 | 5/2017 | Karandikar et al. |
| 9,661,018 B1 | 5/2017 | Aziz |
| 9,674,298 B1 | 6/2017 | Edwards et al. |
| 9,680,862 B2 | 6/2017 | Ismael et al. |
| 9,690,606 B1 | 6/2017 | Ha et al. |
| 9,690,933 B1 | 6/2017 | Singh et al. |
| 9,690,935 B2 | 6/2017 | Shiffer et al. |
| 9,690,936 B1 | 6/2017 | Malik et al. |
| 9,736,179 B2 | 8/2017 | Ismael |
| 9,740,857 B2 | 8/2017 | Ismael et al. |
| 9,747,446 B1 | 8/2017 | Pidathala et al. |
| 9,756,074 B2 | 9/2017 | Aziz et al. |
| 9,773,112 B1 | 9/2017 | Rathor et al. |
| 9,781,144 B1 | 10/2017 | Otvagin et al. |
| 9,787,700 B1 | 10/2017 | Amin et al. |
| 9,787,706 B1 | 10/2017 | Otvagin et al. |
| 9,792,196 B1 | 10/2017 | Ismael et al. |
| 9,824,209 B1 | 11/2017 | Ismael et al. |
| 9,824,211 B2 | 11/2017 | Wilson |
| 9,824,216 B1 | 11/2017 | Khalid et al. |
| 9,825,976 B1 | 11/2017 | Gomez et al. |
| 9,825,989 B1 | 11/2017 | Mehra et al. |
| 9,838,408 B1 | 12/2017 | Karandikar et al. |
| 9,838,411 B1 | 12/2017 | Aziz |
| 9,838,416 B1 | 12/2017 | Aziz |
| 9,838,417 B1 | 12/2017 | Khalid et al. |
| 9,846,776 B1 | 12/2017 | Paithane et al. |
| 9,876,701 B1 | 1/2018 | Caldejon et al. |
| 9,888,016 B1 | 2/2018 | Amin et al. |

(56) References Cited

U.S. PATENT DOCUMENTS

| | | |
|---|---|---|
| 9,888,019 B1 | 2/2018 | Pidathala et al. |
| 9,910,988 B1 | 3/2018 | Vincent et al. |
| 9,912,644 B2 | 3/2018 | Cunningham |
| 9,912,681 B1 | 3/2018 | Ismael et al. |
| 9,912,684 B1 | 3/2018 | Aziz et al. |
| 9,912,691 B2 | 3/2018 | Mesdaq et al. |
| 9,912,698 B1 | 3/2018 | Thioux et al. |
| 9,916,440 B1 | 3/2018 | Paithane et al. |
| 9,921,978 B1 | 3/2018 | Chan et al. |
| 9,934,376 B1 | 4/2018 | Ismael |
| 9,934,381 B1 | 4/2018 | Kindlund et al. |
| 9,946,568 B1 | 4/2018 | Ismael et al. |
| 9,954,890 B1 | 4/2018 | Staniford et al. |
| 9,973,531 B1 | 5/2018 | Thioux |
| 10,002,252 B2 | 6/2018 | Ismael et al. |
| 10,019,338 B1 | 7/2018 | Goradia et al. |
| 10,019,573 B2 | 7/2018 | Silberman et al. |
| 10,025,691 B1 | 7/2018 | Ismael et al. |
| 10,025,927 B1 | 7/2018 | Khalid et al. |
| 10,027,689 B1 | 7/2018 | Rathor et al. |
| 10,027,690 B2 | 7/2018 | Aziz et al. |
| 10,027,696 B1 | 7/2018 | Rivlin et al. |
| 10,033,747 B1 | 7/2018 | Paithane et al. |
| 10,033,748 B1 | 7/2018 | Cunningham et al. |
| 10,033,753 B1 | 7/2018 | Islam et al. |
| 10,033,759 B1 | 7/2018 | Kabra et al. |
| 10,050,998 B1 | 8/2018 | Singh |
| 10,068,091 B1 | 9/2018 | Aziz et al. |
| 10,075,455 B2 | 9/2018 | Zafar et al. |
| 10,083,302 B1 | 9/2018 | Paithane et al. |
| 10,084,813 B2 | 9/2018 | Eyada |
| 10,089,461 B1 | 10/2018 | Ha et al. |
| 10,097,573 B1 | 10/2018 | Aziz |
| 10,104,102 B1 | 10/2018 | Neumann |
| 10,108,446 B1 | 10/2018 | Steinberg et al. |
| 10,121,000 B1 | 11/2018 | Rivlin et al. |
| 10,122,746 B1 | 11/2018 | Manni et al. |
| 10,133,863 B2 | 11/2018 | Bu et al. |
| 10,133,866 B1 | 11/2018 | Kumar et al. |
| 10,146,810 B2 | 12/2018 | Shiffer et al. |
| 10,148,693 B2 | 12/2018 | Singh et al. |
| 10,165,000 B1 | 12/2018 | Aziz et al. |
| 10,169,585 B1 | 1/2019 | Pilipenko et al. |
| 10,176,321 B2 | 1/2019 | Abbasi et al. |
| 10,181,029 B1 | 1/2019 | Ismael et al. |
| 10,191,861 B1 | 1/2019 | Steinberg et al. |
| 10,192,052 B1 | 1/2019 | Singh et al. |
| 10,198,574 B1 | 2/2019 | Thioux et al. |
| 10,200,384 B1 | 2/2019 | Mushtaq et al. |
| 10,210,329 B1 | 2/2019 | Malik et al. |
| 10,216,927 B1 | 2/2019 | Steinberg |
| 10,218,740 B1 | 2/2019 | Mesdaq et al. |
| 10,242,185 B1 | 3/2019 | Goradia |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0095607 A1 | 7/2002 | Lin-Hendel |
| 2002/0116627 A1 | 8/2002 | Tarbotton et al. |
| 2002/0144156 A1 | 10/2002 | Copeland |
| 2002/0162015 A1 | 10/2002 | Fang |
| 2002/0166063 A1 | 11/2002 | Lachman et al. |
| 2002/0169952 A1 | 11/2002 | DiSanto et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0021728 A1 | 1/2003 | Sharpe et al. |
| 2003/0074578 A1 | 4/2003 | Ford et al. |
| 2003/0084318 A1 | 5/2003 | Schertz |
| 2003/0101381 A1 | 5/2003 | Mateev et al. |
| 2003/0115483 A1 | 6/2003 | Liang |
| 2003/0188190 A1 | 10/2003 | Aaron et al. |
| 2003/0191957 A1 | 10/2003 | Hypponen et al. |
| 2003/0200460 A1 | 10/2003 | Morota et al. |
| 2003/0212902 A1 | 11/2003 | van der Made |
| 2003/0229801 A1 | 12/2003 | Kouznetsov et al. |
| 2003/0237000 A1 | 12/2003 | Denton et al. |
| 2004/0003323 A1 | 1/2004 | Bennett et al. |
| 2004/0006473 A1 | 1/2004 | Mills et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0088581 A1 | 5/2004 | Brawn et al. |
| 2004/0093513 A1 | 5/2004 | Cantrell et al. |
| 2004/0111531 A1 | 6/2004 | Staniford et al. |
| 2004/0117478 A1 | 6/2004 | Triulzi et al. |
| 2004/0117624 A1 | 6/2004 | Brandt et al. |
| 2004/0128355 A1 | 7/2004 | Chao et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0005159 A1 | 1/2005 | Oliphant |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0091652 A1 | 4/2005 | Ross et al. |
| 2005/0108562 A1 | 5/2005 | Khazan et al. |
| 2005/0114663 A1 | 5/2005 | Cornell et al. |
| 2005/0125195 A1 | 6/2005 | Brendel |
| 2005/0149726 A1 | 7/2005 | Joshi et al. |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0240781 A1 | 10/2005 | Gassoway |
| 2005/0262562 A1 | 11/2005 | Gassoway |
| 2005/0265331 A1 | 12/2005 | Stolfo |
| 2005/0283839 A1 | 12/2005 | Cowburn |
| 2006/0010495 A1 | 1/2006 | Cohen et al. |
| 2006/0015416 A1 | 1/2006 | Hoffman et al. |
| 2006/0015715 A1 | 1/2006 | Anderson |
| 2006/0015747 A1 | 1/2006 | Van de Ven |
| 2006/0021029 A1 | 1/2006 | Brickell et al. |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber et al. |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0248519 A1 | 11/2006 | Jaeger et al. |
| 2006/0248582 A1 | 11/2006 | Panjwani et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |

(56) References Cited

U.S. PATENT DOCUMENTS

| | | |
|---|---|---|
| 2007/0019286 A1 | 1/2007 | Kikuchi |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0074169 A1 | 3/2007 | Chess et al. |
| 2007/0094730 A1 | 4/2007 | Bhikkaji et al. |
| 2007/0101435 A1 | 5/2007 | Konanka et al. |
| 2007/0128855 A1 | 6/2007 | Cho et al. |
| 2007/0142030 A1 | 6/2007 | Sinha et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0168988 A1 | 7/2007 | Eisner et al. |
| 2007/0171824 A1 | 7/2007 | Ruello et al. |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0208822 A1 | 9/2007 | Wang et al. |
| 2007/0220607 A1 | 9/2007 | Sprosts et al. |
| 2007/0240218 A1 | 10/2007 | Tuvell et al. |
| 2007/0240219 A1 | 10/2007 | Fuvell et al. |
| 2007/0240220 A1 | 10/2007 | Fuvell et al. |
| 2007/0240222 A1 | 10/2007 | Fuvell et al. |
| 2007/0250930 A1 | 10/2007 | Aziz et al. |
| 2007/0256132 A2 | 11/2007 | Oliphant |
| 2007/0271446 A1 | 11/2007 | Nakamura |
| 2008/0005782 A1 | 1/2008 | Aziz |
| 2008/0018122 A1 | 1/2008 | Zierler et al. |
| 2008/0028463 A1 | 1/2008 | Dagon et al. |
| 2008/0040710 A1 | 2/2008 | Chiriac |
| 2008/0046781 A1 | 2/2008 | Childs et al. |
| 2008/0066179 A1 | 3/2008 | Liu |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0086720 A1 | 4/2008 | Lekel |
| 2008/0098476 A1 | 4/2008 | Syversen |
| 2008/0120722 A1 | 5/2008 | Sima et al. |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184367 A1 | 7/2008 | McMillan et al. |
| 2008/0184373 A1 | 7/2008 | Traut et al. |
| 2008/0189787 A1 | 8/2008 | Arnold et al. |
| 2008/0201778 A1 | 8/2008 | Guo et al. |
| 2008/0209557 A1 | 8/2008 | Herley et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0313738 A1 | 12/2008 | Enderby |
| 2008/0320594 A1 | 12/2008 | Jiang |
| 2009/0003317 A1 | 1/2009 | Kasralikar et al. |
| 2009/0007100 A1 | 1/2009 | Field et al. |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0037835 A1 | 2/2009 | Goldman |
| 2009/0044024 A1 | 2/2009 | Oberheide et al. |
| 2009/0044274 A1 | 2/2009 | Budko et al. |
| 2009/0064332 A1 | 3/2009 | Porras et al. |
| 2009/0077666 A1 | 3/2009 | Chen et al. |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Proves et al. |
| 2009/0113425 A1 | 4/2009 | Ports et al. |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0144823 A1 | 6/2009 | Lamastra et al. |
| 2009/0158430 A1 | 6/2009 | Borders |
| 2009/0172815 A1 | 7/2009 | Gu et al. |
| 2009/0187992 A1 | 7/2009 | Poston |
| 2009/0193293 A1 | 7/2009 | Stolfo et al. |
| 2009/0198651 A1 | 8/2009 | Shiffer et al. |
| 2009/0198670 A1 | 8/2009 | Shiffer et al. |
| 2009/0198689 A1 | 8/2009 | Frazier et al. |
| 2009/0199274 A1 | 8/2009 | Frazier et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300415 A1 | 12/2009 | Zhang et al. |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0005146 A1 | 1/2010 | Drako et al. |
| 2010/0011205 A1 | 1/2010 | McKenna |
| 2010/0017546 A1 | 1/2010 | Poo et al. |
| 2010/0030996 A1 | 2/2010 | Butler, II |
| 2010/0031353 A1 | 2/2010 | Thomas et al. |
| 2010/0037314 A1 | 2/2010 | Perdisci et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |
| 2010/0132038 A1 | 5/2010 | Zaitsev |
| 2010/0154056 A1 | 6/2010 | Smith et al. |
| 2010/0180344 A1 | 7/2010 | Malyshev et al. |
| 2010/0192223 A1 | 7/2010 | Ismael et al. |
| 2010/0220863 A1 | 9/2010 | Dupaquis et al. |
| 2010/0235831 A1 | 9/2010 | Dittmer |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2010/0299754 A1 | 11/2010 | Amit et al. |
| 2010/0306173 A1 | 12/2010 | Frank |
| 2011/0004737 A1 | 1/2011 | Greenebaum |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0055907 A1 | 3/2011 | Narasimhan et al. |
| 2011/0078794 A1 | 3/2011 | Manni et al. |
| 2011/0093951 A1 | 4/2011 | Aziz |
| 2011/0099620 A1 | 4/2011 | Stavrou et al. |
| 2011/0099633 A1 | 4/2011 | Aziz |
| 2011/0099635 A1 | 4/2011 | Silberman et al. |
| 2011/0113231 A1 | 5/2011 | Kaminsky |
| 2011/0145918 A1 | 6/2011 | Jung et al. |
| 2011/0145920 A1 | 6/2011 | Mahaffey et al. |
| 2011/0145934 A1 | 6/2011 | Abramovici et al. |
| 2011/0167493 A1 | 7/2011 | Song et al. |
| 2011/0167494 A1 | 7/2011 | Bowen et al. |
| 2011/0173213 A1 | 7/2011 | Frazier et al. |
| 2011/0173460 A1 | 7/2011 | Ito et al. |
| 2011/0219449 A1 | 9/2011 | St. Neitzel et al. |
| 2011/0219450 A1 | 9/2011 | McDougal et al. |
| 2011/0225624 A1 | 9/2011 | Sawhney et al. |
| 2011/0225655 A1 | 9/2011 | Niemela et al. |
| 2011/0247072 A1 | 10/2011 | Staniford et al. |
| 2011/0265182 A1 | 10/2011 | Peinado et al. |
| 2011/0289582 A1 | 11/2011 | Kejriwal et al. |
| 2011/0302587 A1 | 12/2011 | Nishikawa et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0023593 A1 | 1/2012 | Puder et al. |
| 2012/0054869 A1 | 3/2012 | Yen et al. |
| 2012/0066698 A1 | 3/2012 | Yanoo |

(56) References Cited

U.S. PATENT DOCUMENTS

| | | |
|---|---|---|
| 2012/0079596 A1 | 3/2012 | Thomas et al. |
| 2012/0084859 A1 | 4/2012 | Radinsky et al. |
| 2012/0096553 A1 | 4/2012 | Srivastava et al. |
| 2012/0110667 A1 | 5/2012 | Zubrilin et al. |
| 2012/0117652 A1 | 5/2012 | Manni et al. |
| 2012/0121154 A1 | 5/2012 | Xue et al. |
| 2012/0124426 A1 | 5/2012 | Maybee et al. |
| 2012/0174186 A1 | 7/2012 | Aziz et al. |
| 2012/0174196 A1 | 7/2012 | Bhogavilli et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0255015 A1 | 10/2012 | Sahita et al. |
| 2012/0255017 A1 | 10/2012 | Sallam |
| 2012/0260342 A1 | 10/2012 | Dube et al. |
| 2012/0266244 A1 | 10/2012 | Green et al. |
| 2012/0278886 A1 | 11/2012 | Luna |
| 2012/0297489 A1 | 11/2012 | Dequevy |
| 2012/0330801 A1 | 12/2012 | McDougal et al. |
| 2012/0331553 A1 | 12/2012 | Aziz et al. |
| 2013/0014259 A1 | 1/2013 | Gribble et al. |
| 2013/0036472 A1 | 2/2013 | Aziz |
| 2013/0047257 A1 | 2/2013 | Aziz |
| 2013/0074185 A1 | 3/2013 | McDougal et al. |
| 2013/0086684 A1 | 4/2013 | Mohler |
| 2013/0097699 A1 | 4/2013 | Balupar et al. |
| 2013/0097706 A1 | 4/2013 | Titonis et al. |
| 2013/0111587 A1 | 5/2013 | Goel et al. |
| 2013/0117852 A1 | 5/2013 | Stute |
| 2013/0117855 A1 | 5/2013 | Kim et al. |
| 2013/0139264 A1 | 5/2013 | Brinkley et al. |
| 2013/0160125 A1 | 6/2013 | Likhachev et al. |
| 2013/0160127 A1 | 6/2013 | Jeong et al. |
| 2013/0160130 A1 | 6/2013 | Mendelev et al. |
| 2013/0160131 A1 | 6/2013 | Madou et al. |
| 2013/0167236 A1 | 6/2013 | Sick |
| 2013/0174214 A1 | 7/2013 | Duncan |
| 2013/0185789 A1 | 7/2013 | Hagiwara et al. |
| 2013/0185795 A1 | 7/2013 | Winn et al. |
| 2013/0185798 A1 | 7/2013 | Saunders et al. |
| 2013/0191915 A1 | 7/2013 | Antonakakis et al. |
| 2013/0196649 A1 | 8/2013 | Paddon et al. |
| 2013/0227691 A1 | 8/2013 | Aziz et al. |
| 2013/0246370 A1 | 9/2013 | Bartram et al. |
| 2013/0247186 A1 | 9/2013 | LeMasters |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2013/0318038 A1 | 11/2013 | Shiffer et al. |
| 2013/0318073 A1 | 11/2013 | Shiffer et al. |
| 2013/0325791 A1 | 12/2013 | Shiffer et al. |
| 2013/0325792 A1 | 12/2013 | Shiffer et al. |
| 2013/0325871 A1 | 12/2013 | Shiffer et al. |
| 2013/0325872 A1 | 12/2013 | Shiffer et al. |
| 2014/0032875 A1 | 1/2014 | Butler |
| 2014/0053260 A1 | 2/2014 | Gupta et al. |
| 2014/0053261 A1 | 2/2014 | Gupta et al. |
| 2014/0130158 A1 | 5/2014 | Wang et al. |
| 2014/0137180 A1 | 5/2014 | Lukacs et al. |
| 2014/0169762 A1 | 6/2014 | Ryu |
| 2014/0179360 A1 | 6/2014 | Jackson et al. |
| 2014/0181131 A1 | 6/2014 | Ross |
| 2014/0189687 A1 | 7/2014 | Jung et al. |
| 2014/0189866 A1 | 7/2014 | Shiffer et al. |
| 2014/0189882 A1 | 7/2014 | Jung et al. |
| 2014/0237600 A1 | 8/2014 | Silberman et al. |
| 2014/0280245 A1 | 9/2014 | Wilson |
| 2014/0283037 A1 | 9/2014 | Sikorski et al. |
| 2014/0283063 A1 | 9/2014 | Thompson et al. |
| 2014/0328204 A1 | 11/2014 | Klotsche et al. |
| 2014/0337836 A1 | 11/2014 | Ismael |
| 2014/0344926 A1 | 11/2014 | Cunningham et al. |
| 2014/0351930 A1* | 11/2014 | Sun ............... H04L 63/1441 726/22 |
| 2014/0351935 A1 | 11/2014 | Shao et al. |
| 2014/0380473 A1 | 12/2014 | Bu et al. |
| 2014/0380474 A1 | 12/2014 | Paithane et al. |
| 2015/0007312 A1 | 1/2015 | Pidathala et al. |
| 2015/0096022 A1 | 4/2015 | Vincent et al. |
| 2015/0096023 A1 | 4/2015 | Mesdaq et al. |
| 2015/0096024 A1 | 4/2015 | Haq et al. |
| 2015/0096025 A1 | 4/2015 | Ismael |
| 2015/0180886 A1 | 6/2015 | Staniford et al. |
| 2015/0186645 A1 | 7/2015 | Aziz et al. |
| 2015/0199513 A1 | 7/2015 | Ismael et al. |
| 2015/0199531 A1 | 7/2015 | Ismael et al. |
| 2015/0199532 A1 | 7/2015 | Ismael et al. |
| 2015/0220735 A1 | 8/2015 | Paithane et al. |
| 2015/0372980 A1 | 12/2015 | Eyada |
| 2016/0004869 A1 | 1/2016 | Ismael et al. |
| 2016/0006756 A1 | 1/2016 | Ismael et al. |
| 2016/0044000 A1 | 2/2016 | Cunningham |
| 2016/0127393 A1 | 5/2016 | Aziz et al. |
| 2016/0191547 A1 | 6/2016 | Zafar et al. |
| 2016/0191550 A1 | 6/2016 | Ismael et al. |
| 2016/0261612 A1 | 9/2016 | Mesdaq et al. |
| 2016/0285914 A1 | 9/2016 | Singh et al. |
| 2016/0301703 A1 | 10/2016 | Aziz |
| 2016/0335110 A1 | 11/2016 | Paithane et al. |
| 2017/0083703 A1 | 3/2017 | Abbasi et al. |
| 2018/0013770 A1 | 1/2018 | Ismael |
| 2018/0048660 A1 | 2/2018 | Paithane et al. |
| 2018/0121316 A1 | 5/2018 | Ismael et al. |
| 2018/0288077 A1 | 10/2018 | Siddiqui et al. |
| 2019/0268152 A1* | 8/2019 | Sandoval ............ G06F 9/44521 |

FOREIGN PATENT DOCUMENTS

| | | |
|---|---|---|
| WO | 0206928 A2 | 1/2002 |
| WO | 02/23805 A2 | 3/2002 |
| WO | 2007117636 A2 | 10/2007 |
| WO | 2008/041950 A2 | 4/2008 |
| WO | 2011/084431 A2 | 7/2011 |
| WO | 2011/112348 A1 | 9/2011 |
| WO | 2012/075336 A1 | 6/2012 |
| WO | 2012/145066 A1 | 10/2012 |
| WO | 2013/067505 A1 | 5/2013 |

OTHER PUBLICATIONS

Vladimir Getov: "Security as a Service in Smart Clouds—Opportunities and Concerns", Computer Software and Applications Conference (COMPSAC), 2012 IEEE 36th Annual, IEEE, Jul. 16, 2012 (Jul. 16, 2012).

Wahid et al., Characterising the Evolution in Scanning Activity of Suspicious Hosts, Oct. 2009, Third International Conference on Network and System Security, pp. 344-350.

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

Yuhei Kawakoya et al: "Memory behavior-based automatic malware unpacking in stealth debugging environment", Malicious and Unwanted Software (Malware), 2010 5th International Conference on, IEEE, Piscataway, NJ, USA, Oct. 19, 2010, pp. 39-46, XP031833827, ISBN:978-1-4244-8-9353-1.

Zhang et al., The Effects of Threading, Infection Time, and Multiple-Attacker Collaboration on Malware Propagation, Sep. 2009, IEEE 28th International Symposium on Reliable Distributed Systems, pp. 73-82.

"Mining Specification of Malicious Behavior"—Jha et al., UCSB, Sep. 2007 https://www.cs.ucsb.edu/.about.chris/research/doc/esec07.sub.-mining.pdf-.

"Network Security: NetDetector—Network Intrusion Forensic System (NIFS) Whitepaper", ("NetDetector Whitepaper"), (2003).

"When Virtual is Better Than Real", IEEEXplore Digital Library, available at, http://ieeexplore.ieee.org/xpl/articleDetails.isp?reload=true&arnumbe- r=990073, (Dec. 7, 2013).

(56) References Cited

OTHER PUBLICATIONS

Abdullah, et al., Visualizing Network Data for Intrusion Detection, 2005 IEEE Workshop on Information Assurance and Security, pp. 100-108.
Adetoye, Adedayo, et al., "Network Intrusion Detection & Response System", ("Adetoye"), (Sep. 2003).
Apostolopoulos, George; hassapis, Constantinos; "V-eM: A cluster of Virtual Machines for Robust, Detailed, and High-Performance Network Emulation", 14th IEEE International Symposium on Modeling, Analysis, and Simulation of Computer and Telecommunication Systems, Sep. 11-14, 2006, pp. 117-126.
Aura, Tuomas, "Scanning electronic documents for personally identifiable information", Proceedings of the 5th ACM workshop on Privacy in electronic society. ACM, 2006.
Baecher, "The Nepenthes Platform: An Efficient Approach to collect Malware", Springer-verlag Berlin Heidelberg, (2006), pp. 165-184.
Bayer, et al., "Dynamic Analysis of Malicious Code", J Comput Virol, Springer-Verlag, France., (2006), pp. 67-77.
Boubalos, Chris, "extracting syslog data out of raw pcap dumps, seclists.org, Honeypots mailing list archives", available at http://seclists.org/honeypots/2003/q2/319 ("Boubalos"), (Jun. 5, 2003).
Chaudet, C., et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.
Chen, P. M. and Noble, B. D., "When Virtual is Better Than Real, Department of Electrical Engineering and Computer Science", University of Michigan ("Chen") (2001).
Cisco "Intrusion Prevention for the Cisco ASA 5500-x Series" Data Sheet (2012).
Cohen, M.I. , "PyFlag—An advanced network forensic framework", Digital investigation 5, Elsevier, (2008), pp. S112-5120.
Costa, M., et al., "Vigilante: End-to-End Containment of Internet Worms", SOSP '05, Association for Computing Machinery, Inc., Brighton U.K., (Oct. 23-26, 2005).
Didier Stevens, "Malicious PDF Documents Explained", Security & Privacy, IEEE, IEEE Service Center, Los Alamitos, CA, US, vol. 9, No. 1, Jan. 1, 2011, pp. 80-82, XP011329453, Issn: 1540-7993, DOI: 10.1109/MSP.2011.14.
Distler, "Malware Analysis: An Introduction", SANS Institute InfoSec Reading Room, SANS Institute, (2007).
Dunlap, George W., et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).
FireEye Malware Analysis & Exchange Network, Malware Protection System, FireEye Inc., 2010.
FireEye Malware Analysis, Modern Malware Forensics, FireEye Inc., 2010.
FireEye v.6.0 Security Target, pp. 1-35, Version 1.1, FireEye Inc., May 2011.
Goel, et al., Reconstructing System State for Intrusion Analysis, Apr. 2008 SIGOPS Operating Systems Review, vol. 42 Issue 3, pp. 21-28.
Gregg Keizer: "Microsoft's HoneyMonkeys Show Patching Windows Works", Aug. 8, 2005, XP055143386, Retrieved from the Internet: URL:http://www.informationweek.com/microsofts-honeymonkeys-show-patching-windows-works/d/d-id/1035069? [retrieved on Jun. 1, 2016].
Heng Yin et al, Panorama: Capturing System-Wide Information Flow for Malware Detection and Analysis, Research Showcase @ CMU, Carnegie Mellon University, 2007.
Hiroshi Shinotsuka, Malware Authors Using New Techniques to Evade Automated Threat Analysis Systems, Oct. 26, 2012, http://www.symantec.com/connect/blogs/, pp. 1-4.
Idika et al., A-Survey-of-Malware-Detection-Techniques, Feb. 2, 2007, Department of Computer Science, Purdue University.
Isohara, Takamasa, Keisuke Takemori, and Ayumu Kubota. "Kernel-based behavior analysis for android malware detection." Computational intelligence and Security (CIS), 2011 Seventh International Conference on. IEEE, 2011.
Kaeo, Merike, "Designing Network Security", ("Kaeo"), (Nov. 2003).
Kevin A Roundy et al: "Hybrid Analysis and Control of Malware", Sep. 15, 2010, Recent Advances in Intrusion Detection, Springer Berlin Heidelberg, Berlin, Heidelberg, pp. 317-338, XP019150454 ISBN:978-3-642-15511-6.
Khaled Salah et al: "Using Cloud Computing to Implement a Security Overlay Network", Security & Privacy, IEEE, IEEE Service Center, Los Alamitos, CA, US, vol. 11, No. 1, Jan. 1, 2013 (Jan. 1, 2013).
Kim, H. , et al., "Autograph: Toward Automated, Distributed Worm Signature Detection", Proceedings of the 13th Usenix Security Symposium (Security 2004), San Diego, (Aug. 2004), pp. 271-286.
King, Samuel T., et al., "Operating System Support for Virtual Machines", ("King"), (2003).
Kreibich, C. , et al., "Honeycomb-Creating Intrusion Detection Signatures Using Honeypots", 2nd Workshop on Hot Topics in Networks (HotNets-11), Boston, USA, (2003).
Kristoff, J. , "Botnets, Detection and Mitigation: DNS-Based Techniques", NU Security Day, (2005), 23 pages.
Lastline Labs, The Threat of Evasive Malware, Feb. 25, 2013, Lastline Labs, pp. 1-8.
Li et al., A VMM-Based System Call Interposition Framework for Program Monitoring, Dec. 2010, IEEE 16th International Conference on Parallel and Distributed Systems, pp. 706-711.
Lindorfer, Martina, Clemens Kolbitsch, and Paolo Milani Comparetti. "Detecting environment-sensitive malware." Recent Advances in Intrusion Detection. Springer Berlin Heidelberg, 2011.
Marchette, David J., "Computer Intrusion Detection and Network Monitoring: A Statistical Viewpoint", ("Marchette"), (2001).
Moore, D., et al., "Internet Quarantine: Requirements for Containing Self-Propagating Code", INFOCOM, vol. 3, (Mar. 30-Apr. 3, 2003), pp. 1901-1910.
Morales, Jose A., et al., ""Analyzing and exploiting network behaviors of malware."", Security and Privacy in Communication Networks. Springer Berlin Heidelberg, 2010. 20-34.
Mori, Detecting Unknown Computer Viruses, 2004, Springer-Verlag Berlin Heidelberg.
Natvig, Kurt, "SANDBOXII: Internet", Virus Bulletin Conference, ("Natvig"), (Sep. 2002).
NetBIOS Working Group. Protocol Standard fora NetBIOS Service on a TCP/UDP transport: Concepts and Methods. STD 19, RFC 1001, Mar. 1987.
Newsome, J. , et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).
Nojiri, D. , et al., "Cooperation Response Strategies for Large Scale Attack Mitigation", DARPA Information Survivability Conference and Exposition, vol. 1, (Apr. 22-24, 2003), pp. 293-302.
Oberheide et al., CloudAV.sub.--N-Version Antivirus in the Network Cloud, 17th USENIX Security Symposium USENIX Security '8 Jul. 28-Aug. 1, 2008 San Jose, CA.
Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").
Silicon Defense, "Worm Containment in the Internal Network", (Mar. 2003), pp. 1-25.
Singh, S. , et al., "Automated Worm Fingerprinting", Proceedings of the ACM/USENIX Symposium on Operating System Design and Implementation, San Francisco, California, (Dec. 2004).
Thomas H. Ptacek, and Timothy N. Newsham , "Insertion, Evasion, and Denial of Service: Eluding Network Intrusion Detection", Secure Networks, ("Ptacek"), (Jan. 1998).

\* cited by examiner

CYBER-SECURITY SYSTEM AND METHOD FOR DETECTING ESCALATION OF PRIVILEGES WITHIN AN ACCESS TOKEN

CROSS REFERENCE TO RELATED APPLICATIONS

This application is based upon and claims the benefit of priority from U.S. Provisional Patent Application No. 62/690,835 filed Jun. 27, 2018, the entire contents of which are incorporated herein by reference.

FIELD

Embodiments of the disclosure relate to the field of cybersecurity. More specifically, one embodiment of the disclosure relates to a token analysis system to detect privilege escalation that is symptomatic of a cybersecurity attack.

GENERAL BACKGROUND

Cybersecurity attacks have become a pervasive problem for organizations as many electronic devices and other resources have been subjected to attack and compromise. A cybersecurity attack, also referred to as a "cyberattack," may involve the infiltration of malicious software (e.g., malware) onto an electronic device, followed by the malware attempting to discretely gain access to sensitive information from a data store within the infected electronic device or within a resource accessible via the infected electronic device. Thereafter, the malware may attempt to alter, destroy, exfiltrate or render non-accessible the sensitive information from the infected electronic device or resource unbeknownst to the entity in control of that electronic device or resource.

Some types of cyberattacks, namely privilege escalation attacks, have become increasingly common and have led to the loss of sensitive data and compromises of electronic devices. In a privilege escalation attack, malware authors may subvert the use of an otherwise legitimate application or binary, running with proper privilege settings, by surreptitiously escalating (e.g., increasing) privileges within an access token. In many situations, privilege escalation attacks use a variation of token stealing, or token manipulation, to escalate the privileges within the access token. After obtaining escalated privileges, the malware may conduct nefarious actions that the electronic device would not be permitted without those privileges.

Herein, an "access token" is an object that contains a set of privileges (e.g., one or more privileges) that control access by a user to a resource available to an electronic device (e.g., endpoint, server, etc.) and control whether an instruction (or operation) may be executed. For certain types of resources, such as components managed by an operating system (OS), access controls may be applied where the OS ensuring that only authorized processes can utilize the resources. In response to an attempt by the user to access the resource, a portion of the OS deployed within the electronic device determines whether the user is permitted access to the resource. This determination is conducted by accessing content from the access token accompanying a resource request to determine (i) whether the user possesses the necessary privileges to access the resource and (ii) what degree or level of access to content maintained by the resource is available to the user. Hence, the OS protects the electronic device and/or resources from unauthorized accesses, and, thereby, from unauthorized operations (read, write/modify, etc.) not intended by the user.

The endpoint or network account control server may maintain access (privilege) tokens associated with its users. Threat actors use a variation of token stealing to increase system privileges (e.g., from lower levels of privilege to administrator levels), whereby the threat actor may be provided access to privileged resources (e.g., protected files). By way of example of privilege level, Intel® X86 architectures running Windows® operating systems have typically four levels of privilege, with Level #0 being the highest privilege level with the broadest access rights and Level #3 being the lowest with narrow access rights. An electronic device operator may have a low privilege level, while a system administrator responsible for managing hundreds of such electronic devices, including that of the operator, may have a high privilege level. Examples of various privileges include permission to CREATE a file in a directory, or to READ or DELETE a file, access an external device, or to READ or WRITE to a socket for communicating over the Internet.

Previous systems for determining token stealing, such as pre-configured hypervisors for example, are resource intensive. Hence, hypervisors may cause user operated endpoints (or other electronic devices with constrained resources) to experience unacceptable data processing latencies, which adversely effects the user's overall experience in using the endpoint (or electronic device).

BRIEF DESCRIPTION OF THE DRAWINGS

Embodiments of the disclosure are illustrated by way of example and not by way of limitation in the figures of the accompanying drawings, in which like references indicate similar elements and in which.

DETAILED DESCRIPTION

I. Overview Summary

Figure 1:
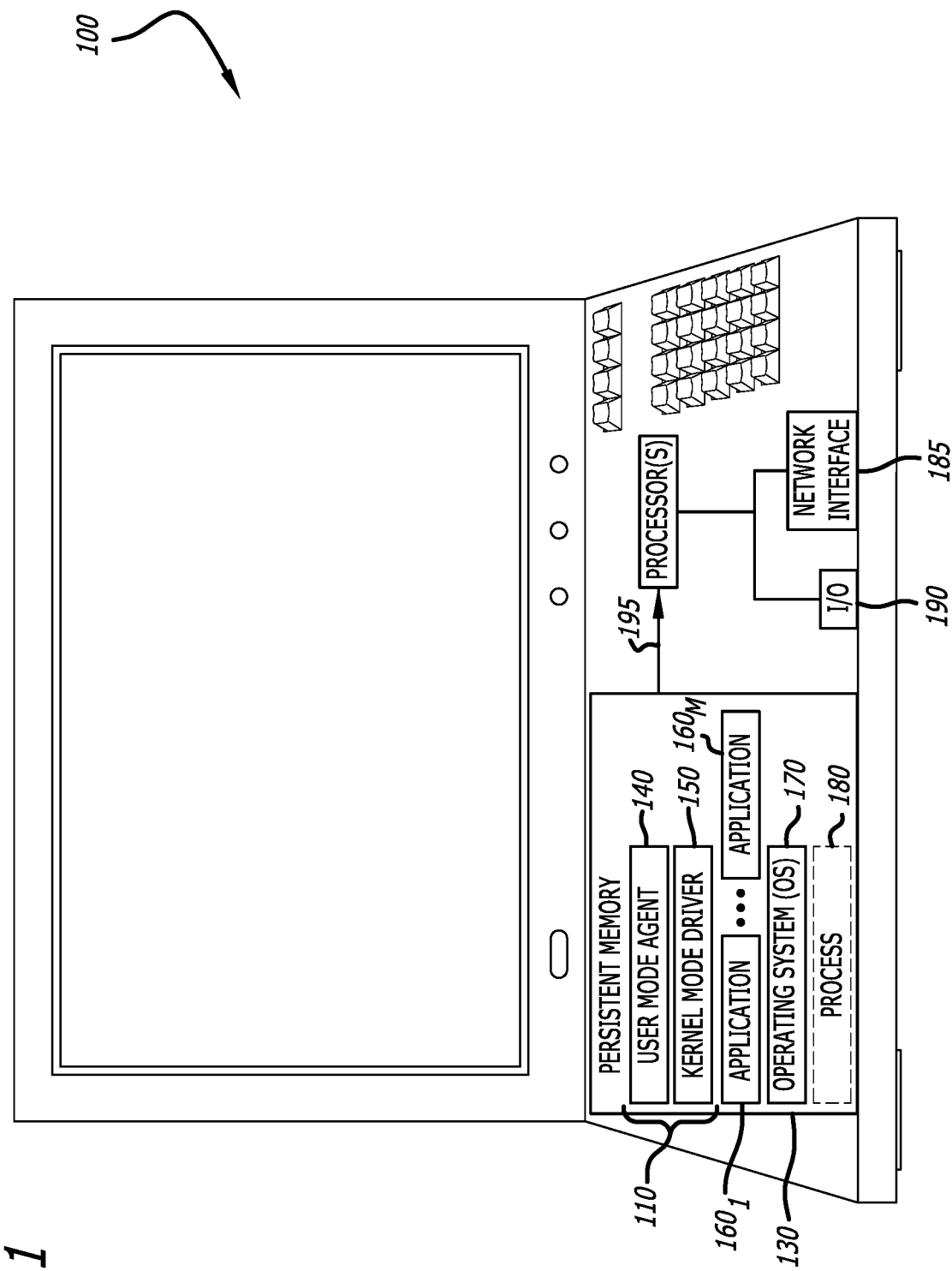
FIG. 1 is an exemplary block diagram of a general, physical representation of logic components of a token analysis system illustrated within an electronic device.

Embodiments of the disclosure relate to a token analysis system and method for detecting privilege escalation within an access token and determining whether the privilege escalation is part of a cyberattack. This particular type of cyberattack is referred to as a "privilege escalation attack." According to one embodiment of the disclosure, the computerized method starts with the storing of metadata for an access token in response to detecting a launch of a process being monitored, where the metadata includes token state information. Herein, for this embodiment, the token state information may include (i) an identifier of the user to which the access token pertains (e.g., user identifier), and (ii) a pointer to the access token data structure including a set of privileges provided to the user from the access token. This stored token state information is then available as a baseline for comparison purposes, as described below. Hence, the stored token state information, being a stored copy of contents of the access token, may also be referred to as a "baseline token snapshot."

It is noted that, for some operating environments, the token analysis system may maintain separate copies of baseline token snapshots (stored token state information) on aper-process basis. Alternatively, the token analysis system may maintain a single copy of the baseline token snapshot on a per token basis, which may be referenced by pointers utilized by processes in other operating environments. Stated differently, multiple baseline token snapshots corresponding to different processes may be used, or alternatively, a single baseline token snapshot is used, but pointers to the same (for all processes) baseline token snapshot may be used.

More specifically, as described below, different token storage schemes may be deployed to ensure that the baseline token snapshot (i.e., stored token state information) is trusted. As a first token storage scheme, a process runs in the context of a user, and thus, the process is assigned an access privilege token at launch. Additionally, during launch, a baseline token snapshot is generated. At this processing stage, the baseline token snapshot is considered to be "trusted" because the access token is not yet being used in accessing resources. The content within the current access token (hereinafter, "current token state information") may be analyzed periodically or aperiodically during execution of the process to ensure that no unauthorized changes to the access token have been made. Such analysis may include retrieval of at least a portion of the current token state information for comparison with at least a portion of the stored token state information corresponding to the baseline token snapshot.

In contrast, as a second token storage scheme, the baseline token snapshot is generated prior to launch of the process. Herein, the baseline token snapshot may be generated during or in response to a condition in which the user gains control to an electronic device. For instance, as an illustrative example, the baseline token snapshot may be generated during or in response to a log-on event by the user. As creation of the baseline token snapshot occurs prior to launch, and again before usage of the access token in gaining access to access-controlled resources, the baseline token snapshot is considered "trusted".

For both the first and second token storage schemes, subsequent (substitute or revised) baseline token snapshots may be generated periodically or upon the occurrence of certain captured events, e.g., when a legitimate request for change to access privileges is requested or granted. For example, access token privileges may be analyzed periodically or aperiodically during execution of a process. The analysis includes the retrieval of the content associated with the current access token (e.g., access privileges, user identifier, etc.) for comparison with corresponding content from the baseline token snapshot (also referred to as the "stored token state information").

Operating system functions (or other function calls) may be executed to change the access token legitimately, and if the access token is being changed using a legitimate function, the baseline token snapshot is revised to produce a new baseline token snapshot for later comparison with access token content. Otherwise, the method continues by detecting a privilege escalation attack, if underway, in response to a variation between the current token state information and the stored token state information and no legitimate functions are not called, which denotes a potential privilege escalation attack. The retrieval and comparison of the content of the current access token with the stored token state information (baseline token snapshot) may occur, in some embodiments for example, at the time of a file access event or other event.

Upon detecting a privilege escalation attack, the token analysis system may be adapted to terminate the malicious process and/or initiate an alert to an endpoint operator and/or, etc.) to nan administrator of a detected escalation attack (e.g., displayed warning, text message, email message, or automated phone call). Optionally, the event analysis logic within the token analysis system may access the access token data store maintained within the kernel space to reset one or more privileges associated with the compromised access token to its intended value, as stored prior to the attack.

More specifically, and according to one embodiment of the disclosure, the token analysis system includes software running in the user space and software running in the kernel space within memory of an electronic device. The "kernel space" is a portion of memory reserved for running a privileged operating system (OS) kernel, kernel extensions, and most device drivers. In contrast, "user space" is a portion of memory where application software executes outside of the kernel space. The token analysis system includes a first component operating in the user space and a second component operating in the kernel space of the electronic device.

Herein, according to one embodiment of the disclosure, the first component includes analysis logic that operates in accordance with a plurality of rules to determine whether a detected privilege escalation is malicious, suspicious or benign. The first component further provides a listing of processes to be monitored. Stored in the user space, the monitored process listing may be modifiable, where listed processes may be added, changed or removed by a security administrator via an input/output (I/O) interface or automatically by software running on the first component updating the listed processes based on white list and black list processes as described below. The addition, change and/or removal of a monitored process may depend, at least in part, on the current threat landscape to which the electronic device is exposed. The current threat landscape may be learned from threat intelligence, including prior privilege escalation attacks detected by the electronic device or by external sources such as (i) another electronic device communicatively coupled to the electronic device or (ii) a management system monitoring operations of the electronic device and/or other electronic devices within an enterprise. Additionally, or in the alternative, the threat intelligence may further include information gathered by a third party source (referred to as "third-party data").

The second component includes event analysis logic, which is configured to (i) monitor for certain processes to obtain the initial access token associated with each process, (ii) monitor for certain events associated with the monitored processes identified by the monitored process listing, and (iii) detect changes to access tokens that modify the level of access to resources. In general, an "event" refers to an operation, task or activity that is performed by a process running on the electronic device. The selection of events to be monitored may be based on experiential knowledge and machine learning. In some situations, the event may be undesired or unexpected, indicating a potential cyberattack is being attempted. Examples of general events that are more susceptible to a cyberattack (and tend to be some of the monitored processes) may include, but are not limited or restricted to a file operation, registry operation, and/or thread creation, as described below.

At start-up for each monitored process (e.g., launch), metadata for an access token that specifies the user and access privileges conferred to that monitored process may be extracted and stored in memory accessible to the second component. The metadata may include and/or provide access to (i) a pointer to the access token data structure and/or (ii) contents of the access token (e.g., user identifier and/or access privileges) for later analysis. As described below, the metadata may be referred to as "stored token state information." Thereafter, in response to detecting one or more selected events during operation of the monitored process, the current token state information (e.g., any token information suitable for use in determining a change in content advantageous in privilege escalation such as token pointer, user identifier, and/or any access privilege) is extracted by the second component and compared to corresponding content of the stored token state information. Privilege escalation is detected based on differences between the current token state information and the stored token state information. Given that not all privileged escalations are malicious, in some situations, the second component may resort to light-weight heuristics or another detection measure to determine whether a privilege escalation is part of a cyberattack, as described below.

Upon detection of privilege escalation and the privilege escalation is determined to be malicious, the first component may cause remedial action to be taken. The first component may cause the processor to terminate the monitored process (and perhaps all processes) to prevent any further malicious activities on the endpoint. Additionally, or in the alternative, the first component may generate an alert to the user or an administrator, reset the access token to its original privilege levels, and quarantine the object that caused the execution of the malicious process by placement of the object in an isolated segment of memory for subsequent analysis and deletion. As used herein, the term "quarantine" may refer to a temporary or permanent halting in processing of the object (e.g., a file, an application or other binary, a Uniform Resource Locator "URL," etc.) initiated by the first component.

More specifically, the token analysis system monitors the operations associated with selected processes. In some embodiments, depending on the availability of endpoint resources, these monitored processes may be a limited subset of those processes running on the endpoint to avoid negatively affecting user experience on the endpoint. However, in some situations, the monitored processes may constitute all of the processes running on the electronic device. The selection of which processes to monitor may be based on a whitelist of typically benign processes and/or a blacklist of processes that are more commonly subverted to malicious activities found in the current threat landscape. The whitelist and blacklist constitute threat intelligence, which may be downloaded into the token analysis system or simply made available to (and accessible by) the token analysis system.

As described above, the token analysis system captures privilege escalations associated with the monitored processes and evaluates those changes to determine whether they are likely part of a privilege escalation attack. According to one embodiment of the disclosure, the first component may correspond to a software agent deployed within the user space of an electronic device (hereinafter, "user mode agent"), which is configured to determine whether a detected privilege escalation is part of a privilege escalation attack. Furthermore, the second component may correspond to a software driver deployed within the kernel space of the electronic device (hereinafter, "kernel mode driver"), which is configured to capture OS notifications directed to accesses of privileged resources and detect the privilege escalation.

For example, according to one embodiment of the disclosure, the kernel mode driver may receive one or more response messages (e.g., callback) directed to one or more requests (e.g., captured or hooked events) associated with monitored processes that are seeking access to a resource using privileges maintained within an access token. The user mode agent analyzes information associated with a privilege escalation detected by the kernel mode driver to determine a threat level of the privilege escalation (e.g., malicious, suspicious or benign). The user mode agent may be configured to issue an alert upon detecting a privileged escalation attack or request information associated with additional captured events produced by the monitored process involved in a suspicious privilege escalation in order to discern if the privilege escalation is malicious or benign.

To determine if a privilege escalation should be classified as malicious or not, the user mode agent may employ (run) heuristics (rules) with respect to information associated with the monitored process and/or event that attempted the privilege escalation. These privilege escalation rules may be tailored to the type of monitored process and further tailored to particular events associated with the monitored process (e.g., process create/terminate events, configuration change events, etc.). In some situations, the events may pertain to the monitored process and any "child" processes (at any tier) resulting therefrom. The heuristics may be used to validate events with monitored processes involved in the detected privilege escalation against a known set of benign and/or malicious events. If the heuristics indicate the events should be deemed malicious, the user mode agent may report a cyberattack is occurring and/or take remedial action. In some embodiments, the analysis of captured events may be conducted by a remote appliance, facility or cloud service rather than by the user mode agent on the endpoint.

It is noted that the determination whether the maliciousness of the monitored process can be based on privilege changes alone, or maliciousness may be based on privilege changes in conjunction with additional suspicious captured events, such as opening a socket for outbound communication after a privilege exception.

The monitored events may include software calls, such as Application Programming Interface (API) calls, system calls and the like. According to another embodiment, the user mode agent may capture (e.g., intercept or hook) any API calls issued by a monitored process, and the kernel mode driver may monitor OS notifications (in response to API calls) to the monitored process that may modify an access token, including privileges escalation. Hence, the user mode agent may determine whether a privilege escalation occurred based on events other than a legitimate API or software call, which may be indicative of maliciousness. In other words, while such APIs are often used to request, legitimately, a change in privilege, if monitoring of the token privileges identifies the change in privilege without use of such an API, the privilege escalation should be deemed at least suspicious of being for malicious purposes.

II. Terminology

In the following description, certain terminology is used to describe various features of the invention. For example, each of the terms "logic" and "component" may be representative of hardware, firmware or software that is configured to perform one or more functions. As hardware, the logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

Herein, a "communication" generally refers to related data that is received, transmitted, or exchanged within a communication session. This data may be received, transmitted, or exchanged in the form a message, namely information in a prescribed format and transmitted in accordance with a suitable delivery protocol. A "message" may be in the form of one or more packets, frames, or any other series of bytes or bits having the prescribed format.

The term "computerized" generally represents that any corresponding operations are conducted by hardware in combination with software and/or firmware.

The term "agent" generally refers to a module of software installed on a target system (e.g., an endpoint) that enables a user (e.g., a human such as an operator of an electronic device, an administrator or an external computer system) to monitor and interact with the target system. Agents allow users to gather information about multiple aspects of the target system. In some embodiments, agents also permit users to remotely retrieve the captured events and select other contents of the target system's memory or hard drive, and could potentially be configured to modify its security rules, configuration information and select other content. The agent may be configured to either communicate over a computer network, or to read and write all relevant configuration information and acquired data to a computer storage medium, such as a hard drive or removable read/write media (USB key, etc.). In one embodiment, the agent may be built in a modular fashion. The ability to gather a particular piece of data from a target system (e.g. a list of running processes on the target system) is implemented as a discrete module of software and loaded by the agent. This allows for easy adaptation of the agent to different environments that have specific requirements for data collection.

According to one embodiment of the disclosure, the term "malware" may be broadly construed as any code, communication or activity that initiates or furthers a cyber-attack. Malware may prompt or cause unauthorized, anomalous, unintended and/or unwanted behaviors or operations constituting a security compromise of information infrastructure. For instance, malware may correspond to a type of malicious computer code that, as an illustrative example, executes an exploit to take advantage of a vulnerability in a network, electronic device or software, for example, to gain unauthorized access, harm or co-opt operation of an electronic device or misappropriate, modify or delete data. Alternatively, as another illustrative example, malware may correspond to information (e.g., executable code, script(s), data, command(s), etc.) that is designed to cause an electronic device to experience anomalous (unexpected or undesirable) behaviors. The anomalous behaviors may include a communication-based anomaly or an execution-based anomaly, which, for example, could (1) alter the functionality of an electronic device executing application software in an atypical manner; (2) alter the functionality of the electronic device executing that application software without any malicious intent; and/or (3) provide unwanted functionality which may be generally acceptable in another context.

The term "electronic device" may be construed as any computing system with the capability of processing data and/or connecting to a network. Such a network may be a public network such as the Internet or a private network such as a wireless data telecommunication network, wide area network, a type of local area network (LAN), or a combination of networks. Examples of an electronic device may include, but are not limited or restricted to, an endpoint (e.g., a laptop, a mobile phone, a tablet, a computer, a wearable such as a smartwatch, Google® Glass, health monitoring device, or the like), a standalone appliance, a server, a video game console, a set top box, a smart (networked) home appliance, a router or other intermediary communication device, a firewall, etc.

The term "transmission medium" may be construed as a physical or logical communication path between two or more electronic devices or between components within an electronic device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more electronic devices or between components within an electronic device.

The term "privilege level" refers to the delegated authority (permissions) of a user to cause (e.g., via one or more processes), an operation, task or an activity to be performed on an electronic device. A user obtains a grant of privileges by presenting credentials to a privilege-granting authority. This may be accomplished by the user logging onto a system with a username and password, and if the username and password supplied are approved, the user is granted privileges as described a certain level of privileges. Such operations or tasks are tagged with a privilege level required for them to be permitted to be performed (demanded privilege). When a task tries to access a resource, or execute a privileged instruction, the processor determines whether the user making the request has the demanded privilege and, if so, access is permitted; otherwise, a "protection fault" interrupt is typically generated. Accordingly, for malware to succeed in gaining access to protected (privileged) resources or otherwise executing privileged instructions, the malware often requires escalated privilege.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

Referring now to FIG. 1, an exemplary block diagram of a physical representation of components of a token analysis system 110 deployed within an electronic device 100 is shown. Herein, the token analysis system 110 may be installed within the electronic device 100, which may correspond to a physical endpoint or a virtual endpoint. A "virtual endpoint" includes a run-time environment operating within a virtual machine (hosted on an electronic device) that simulates operations of a physical endpoint, where one or more events produced during runtime of an object are monitored and analyzed as to whether such events are part of a cyberattack (e.g., a privilege escalation attack). A "physical" endpoint is an electronic device with electronics such as a laptop computer, a wearable, or the like.

As shown in FIG. 1, the token analysis system 110 is deployed within the endpoint 100. The endpoint 100 includes one or more processors 120 and persistent memory 130 (e.g., non-transitory computer-readable medium storage). The persistent memory 130 may include a user mode agent 140 and a kernel mode driver 150. The persistent memory 130 may further include one or more applications $160_1$-$160_M$ (M≥1) and an operating system (OS) 170. Herein, a processor 120 of the endpoint device 100 running the OS 170 (e.g., Windows® OS) has two different operating modes: a first operating mode and a second operating mode. The processor 120 is configured to switch between these two operating modes depending on what type of code is running on the processor 120. For instance, the user mode agent 140 and applications $160_1$-$160_M$ run during the first operating mode while the kernel mode driver 150 and certain OS components 170 run during second operating mode. The user mode agent 140 and the kernel mode driver 150 collectively operate to detect a modification of an access token (e.g., a privilege escalation) and determine whether the privilege escalation is part of a cyberattack.

When a user-mode application (e.g., application $160_1$) is launched, the processor 120 creates a process 180 (instance) for that application $160_1$. During run-time, the process 180 performs certain events. As described above, an "event" generally refers to a task or an activity that is performed by a process initiated by a software component, such as application $160_1$ for example, running on the endpoint (virtual or real). In some situations, the event may be undesired or unexpected, indicating a potential cyberattack is being attempted. Examples of such events may include, but are not limited or restricted to a file operation (e.g., open file, close file, etc.), registry operation (e.g., change registry key, change registry value, etc.), thread creation, or the like.

For certain processes being monitored by the kernel mode driver 150, content associated with events produced by the monitored processes, namely current state information associated with an access token (i.e., current token state information), may be evaluated (e.g., compared) to previously stored (cached) state information associated with the access token (i.e. stored token state information) to determine whether the access token has been impermissibly altered. As described above, the stored token state information is then available as a baseline for comparison purposes, gathered during launching of the process (as described below) or during a pre-launch state (e.g., response to a log-on event, etc.). The current token state information may include an address pointer to a structure associated with the access token, a user identifier identifying the user associated with the access token, and/or access privilege parameters associated with the user.

The endpoint 100 includes one or more interfaces 180, which may include a network interface 185 and/or input/output (I/O) interfaces 190. According to this embodiment of the disclosure, these components are connected by a transmission medium 195, such as any type of interconnect (e.g., bus), are at least partially encased in a housing made entirely or partially of a rigid material (e.g., hardened plastic, metal, glass, composite, or any combination thereof). The housing protects these components from environmental conditions.

Figure 2:
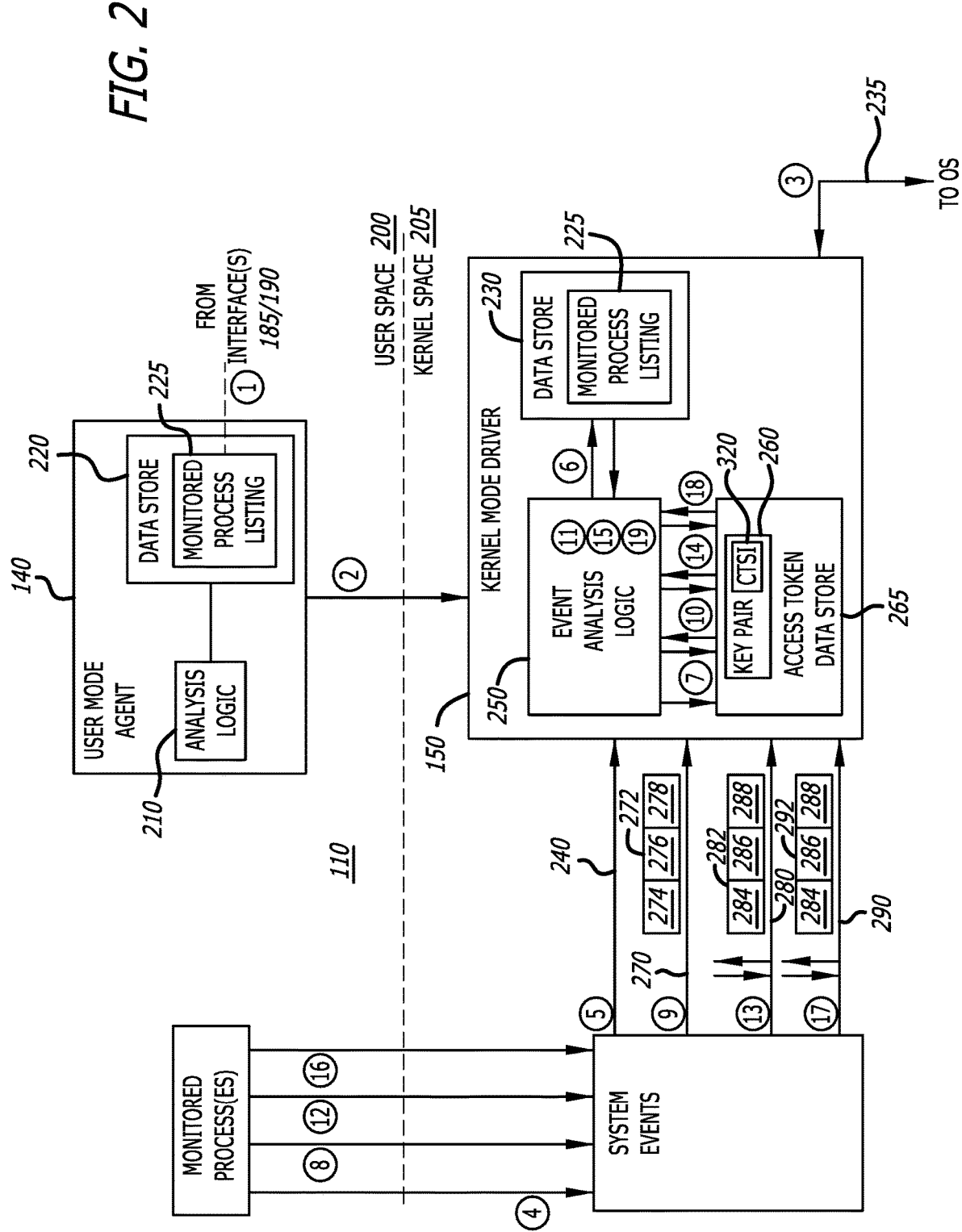
FIG. 2 is an exemplary embodiment of a logical representation of the logic components of the token analysis system of FIG. 1.

Referring to FIG. 2, an exemplary block diagram of operations of the token analysis system 110 is shown. The token analysis system 110 is shown located in both the user space 200 (e.g., upper section) and the kernel space 205 (e.g., lower section), e.g., includes components located in each space. The user mode agent 140 of the token analysis system 110 is located in user space 200 while the kernel mode driver 150 is located in kernel space 205. The exemplary interactions between the user mode agent 140 and the kernel mode driver 150 are referenced by circled numbers, which correspond to operations of one or more of the components illustrated.

Initially, according to one embodiment of the disclosure, the token analysis system 110 may be configured to monitor selected processes as to whether such processes are involved in a privilege escalation attack. As shown, the user mode agent 140 includes analysis logic 210, which is communicatively coupled to a data store 220 that maintains a monitored process listing 225. Herein, the data store 220 may be implemented as part of the user mode agent 140 or may be external from the user mode agent 140 and, for example, within or remote to (depending on the embodiment) the endpoint 100. According to this embodiment, the monitored process listing 225 identifies one or more processes that are selected to be monitored by the kernel mode driver 150 for privilege escalation. Herein, the processes within the monitored process listing 225 may be identified by specific process name, although other metadata may be used in identifying such processes (e.g., pointer to data structure of the process, etc.).

The monitored process listing 225 may be pre-loaded at installation of the token analysis system 110, and thereafter, the monitored processes within the listing 225 may be altered (e.g., added, removed, updated, etc.) from time to time. Hence, the data store 220 is communicatively coupled to receive information for updating the monitored process listing 225 via a network interface 185 or an I/O interface 190 as shown in FIG. 1 (operation 1). Such communicative coupling allows for monitored processes to be changed based on the threat landscape, which may be at least partially represented by threat analysis data received from another electronic device that is part of the same enterprise network (e.g., a management system gathering cybersecurity information from other electronic devices, etc.) or from a third party source over a public network (e.g., internet download, etc.).

More specifically, as shown in FIG. 2, the user mode agent 140 interacts with the kernel mode driver 150 to download the monitored process listing 225 on a synchronous or asynchronous basis (operation 2). For instance, the user mode agent 140 may download the monitored process listing 225 in response to an event, such as a notification of availability of an update (e.g., removal, change, or addition of a monitored process to the listing 225). Additionally, or in the alternative, the user mode agent 140 may download the monitored process listing 225 on a periodic (synchronous) basis (e.g., at a prescribed time, after a prescribed time period has elapsed from the last download, etc.). The kernel mode driver 150 stores the monitored process listing 225 in a data store 230 accessible by event analysis logic 250 of the kernel mode driver 150.

Thereafter, the kernel mode driver 150 subscribes to the Operating System (OS) of the electronic device 100 to receive information associated with events for each of the monitored processes of the process listing 225 (operation 3). In particular, the kernel mode driver 150 initiates a request message 235 via an Application Programming Interfaces (API) to the OS of the electronic device 100, which sets the OS to generate a response message (e.g., callback) to the kernel mode driver 150 in response to a monitored process being launched (operation 4) and certain subsequent events being performed while the monitored process is active (operations 8, 12 or 16). An example of one of the APIs may include PsSetCreateProcessNotifyRoutine. As a result, response messages (callbacks) for events performed by one or more monitored processes may be further received in response to selected events being attempted by the monitored process, such as a file operation, a registry operation, a thread creation, or another selected event being conducted during the monitored process.

For instance, as shown in FIG. 2, in response to a monitored process being launched under a particular user context, the kernel mode driver 150 receives a response message (e.g., callback) 240 associated with a creation of the process (operation 5). The event analysis logic 250 within the kernel mode driver 150 accesses the monitored process listing 225 stored in the data store 230 to confirm that the process identified in the callback message 240 is one of the monitored processes (operation 6). Upon determining that the process is one of the monitored processes, the event analysis logic 250 of the kernel mode driver 150 effectively stores a key value pair 260 associated with the monitored process into an access token data store 265 (operation 7). Each key value pair (e.g., key value pair 260) includes (or provides access to) stored token state information (CTSI) 320 that features the initial privileges maintained by the access token, which identifies the security context (demanded privilege) of the process.

More specifically, the stored token state information 320 operates as a "baseline token snapshot" to capture a trusted copy of contents of the access token. For one embodiment, during launch of the monitored process the stored token state information (baseline token snapshot) 320 is generated. The stored token state information 320 is considered to be "trusted" because the access token has not yet being used in accessing resources. It is noted that, for some operating environments, the token analysis system 110 may maintain separate copies of stored token state information 320 on a per-process basis. Alternatively, the token analysis system 110 may maintain a single copy of the stored token state information 320 on a per token basis, which may be referenced by pointers utilized by processes in other operating environments. However, for another embodiment, in lieu of capturing the stored token state information during launching of the monitored process, the stored token state information 320 may be generated before such launching. For example, the stored token state information 320 (baseline token snapshot) may be generated during or in response to a condition in which the user gains control to an electronic device, such as during a user log-on process.

Independent as to when the "trusted" baseline token snapshot 320 is captured, subsequent (substitute or revised) baseline token snapshots may be generated periodically or upon the occurrence of certain captured events. One type of event may be in response to a legitimate request for change to access privileges is requested or granted. Hence, access token privileges may be analyzed periodically or aperiodically during execution of a process, and the stored token state information 320 may be updated accordingly.

Figure 3A:
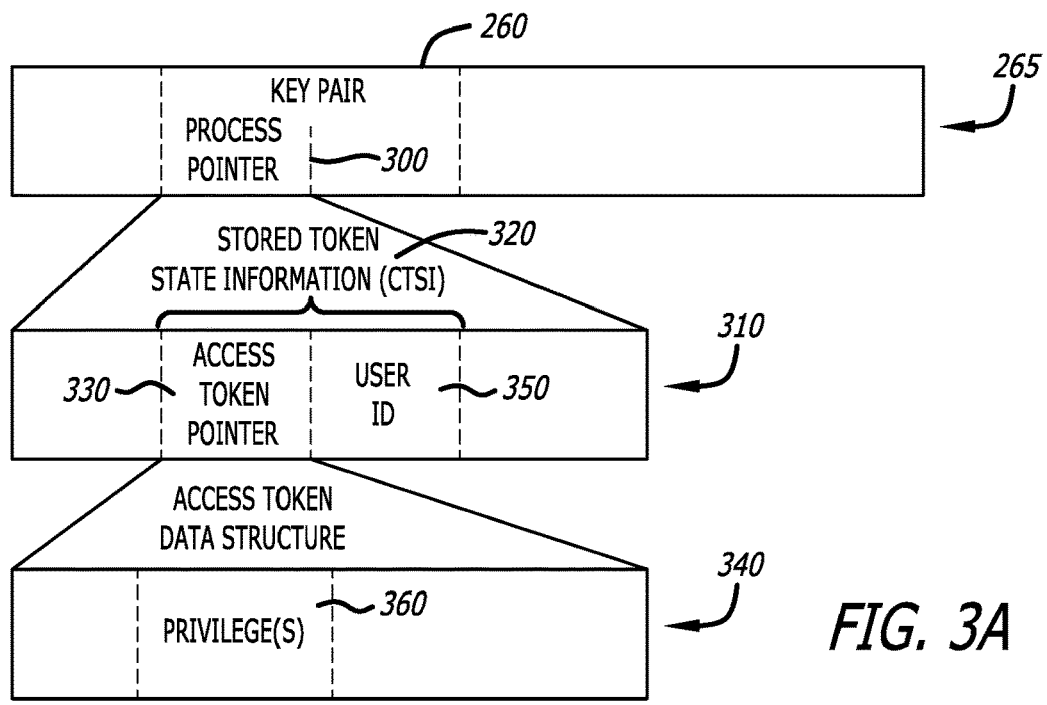
FIG. 3A is an exemplary embodiment of the access token data store accessible by the kernel mode agent of FIG. 2 and providing storage for the stored token state information.

Referring now to FIG. 3A, an exemplary embodiment of storage of the stored token state information within the access token data store 265 is shown. The key value pair 260 represents the initial token state of the monitored process, including a pointer 300 to a data structure 310 for the monitored process as allocated by the OS (e.g., the "EPROCESS" data structure for Windows® OS) and one or more parameters 320 associated with an access token for the monitored process, namely the stored token state information that is accessible from the monitored process data structure 310. The stored token state information 320 may include, but are not limited or restricted to, a pointer 330 to an access token data structure 340, an identifier of the user (User ID 350) associated with the access token maintained within the access token data structure 340, and privileges 360 maintained within the access token data structure 340 that apply to the user identified by the User ID 350. The User ID 350 and privileges 360 collectively identify the level of access afforded to the user of endpoint and/or network resources. It is contemplated that the pointer 330, User ID 350 and privileges 360 may be stored together or in accordance with any storage nesting scheme.

Referring back to FIG. 2, in response to a selected event performed by the process being monitored, such as a file operation (e.g., open file) for example, a file operation callback message 270 is provided to the kernel mode driver 150 (operations 8&9). The file operation callback message 270 includes the pointer 300 to the monitored process data structure 310, from which the event analysis logic 250 may obtain the current token state information 272 for the monitored process for comparison to the stored token state information 320 retrieved from the access token data store 265 (operations 10&11). Based on this comparison, the event analysis logic 250 is able to detect a potential privilege escalation attack.

Figure 3B:
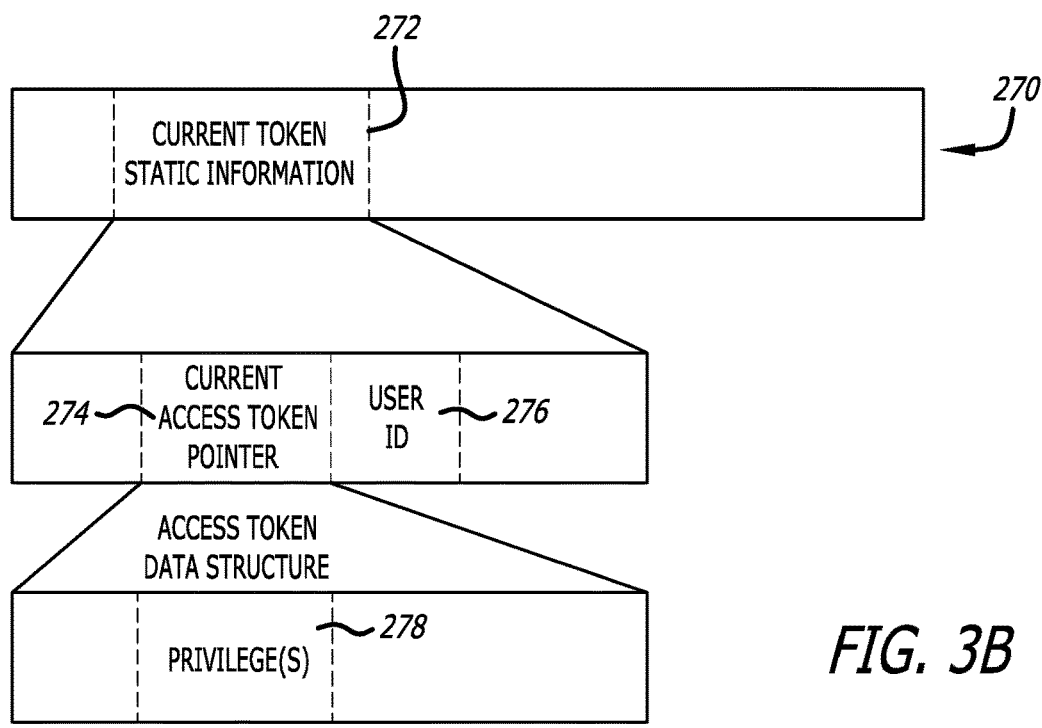
FIG. 3B is an exemplary embodiment of current token state information associated with a current copy of the access token being part of an event for subsequent comparison to the stored token state information of FIG. 3A.

As an illustrative example, as shown in FIG. 3B, from the file operation callback message 270, the event analysis logic 250 may obtain the current token state information 272 associated with a current copy of the access token 265 relied upon for the file operation. The event analysis logic 250 may further obtain a current pointer 274 to the access token data structure accessible via content within the file operation callback message 270; a user identifier 276 accessible via content within the file operation callback message 270; and current privileges 278 of the current copy of the access token 265 assigned accessible within the access token data structure and assigned to the user identified by the user identifier 276. Thereafter, the event analysis logic 250 compares (i) the current pointer 274 to the stored pointer 300 of FIG. 3A, (ii) the user identifier 276 to the User ID 350 of FIG. 3A, and (iii) the current privileges 278 to the stored privileges 360 of FIG. 3A.

More specifically, in response to the content of the current pointer 274 being altered and different from the content of the pointer 300 of FIG. 3A stored at commencement of the monitored process or the content of the user identifier 276 being altered and different from the content of the User ID 350 of FIG. 3A, the event analysis logic 250 transmits a detection message to the user mode agent 140 of the potential privilege escalation attack. Additionally, in response to the content of the current privileges 278 being different than the stored privileges 360 of FIG. 3A, the event analysis logic 250 transmits a detection message to the user mode agent 140 of the potential privilege escalation attack as illustrated in FIG. 4.

Referring back to FIG. 2, in response to another selected event performed by the monitored process, such as a registry modification (operation 12) or a thread creation (operation 16) for example, a callback message 280 for the registry modification (operation 13) or a callback message 285 for the thread creation (operation 17) is provided to the kernel mode driver 150. Each of these callback messages 280/290 may include a current pointer 282/292 to the monitored process data structure to read current token state information for the monitored process (e.g., pointer 284/294 to the access token data structure; user identifier 286/296, privileges 288/298), which is compared against the stored token state information 320 (e.g., stored pointer 300, User ID 350 and/or stored privileges 360 of FIG. 3A), which are retrieved from the access token data store 265 (operation 14 or operation 18). As before, based on uncovered changes in the current token state information, such as access token pointer value, the user identifier or stored privileges for the identified user for example, the event analysis logic 250 is able to detect a potential privilege escalation attack (operation 15 or operation 19).

Figure 4:
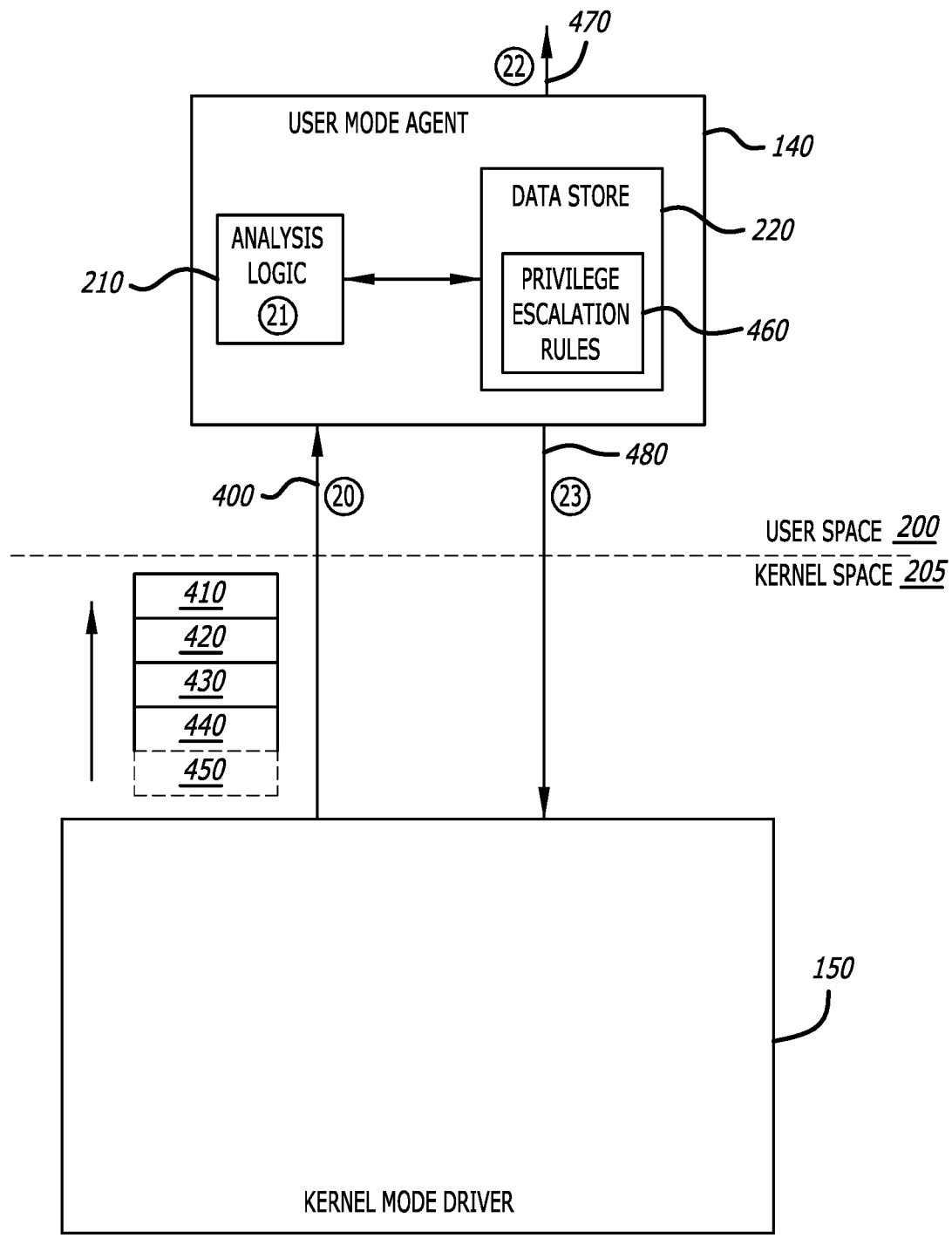
FIG. 4 is an exemplary embodiment of a flowchart illustrating the operations of detecting and analyzing a privilege escalation detected by the kernel mode driver of FIG. 2 and a notification of the detection being provided to the user mode agent of FIG. 2.

Referring now to FIG. 4, an exemplary embodiment of the operations conducted for detecting a privilege escalation by the kernel mode driver 150 and analysis of the privilege escalation by the user mode agent 140 of FIG. 2 is shown. Upon detection of a potential privilege escalation, the kernel mode driver 150 uploads a detection message 400 to the user mode agent 140 (operation 20). The detection message 400 represents detection of a potential privilege escalation attack requiring further analysis. The detection message 400 features a data structure including (i) information 410 identifies the monitored process (e.g., process name or process identifier), (ii) information 420 that identifies the event in which a change to one or more parameters of the access token was detected (e.g., event name or event identifier), and (iii) information 430 that identifies changes to token state information (e.g., metadata associated with the access token). The token state information 430 may include information associated with (a) changes made from the access token pointer 300 for accessing the access token data structure 340, (b) changes made from the User ID 350, and/or (c) changes made from the stored privileges 360. Additionally, it is contemplated that the detection message 400 may further identify (d) the particular privileges 440 of the access token that are enabled and/or (e) the current User ID 450, where the user identifier has not changed.

Upon receipt of the detection message 400, the analysis logic 210 of the user mode agent 140 extracts the information 410, 420 and 430 and determines a threat level of the detected privilege escalation in accordance with the privilege escalation rules 460 that control operability of the analysis logic 210 (operation 21). According to one embodiment of the disclosure, the analysis logic 210 applies portions of the extracted information 410, 420 and/or 430 to the privilege escalation rules 460 to determine a threat level for the monitored process (operation 20). The threat level may be categorized as (1) "benign" (e.g., a confirmed legitimate privilege escalation); (2) "malicious" (e.g., a confirmed unauthorized privilege escalation associated with a privilege escalation attack); or (3) "suspicious" (e.g., an unauthorized privilege escalation but indeterminate of malicious intent).

Referring still to FIG. 4, responsive to a privilege escalation detection caused by a change in the access token data structure pointer and/or a change in the user identifier, the analysis logic 210 concludes that the monitored process (and monitored event associated the monitored process) is associated with a privilege escalation attack. However, the analysis logic 210 may conclude a detected privilege escalation is suspicious or not malicious, depending on the type of privilege(s) being modified and/or scope of such modification. As an illustrative example, a minor privilege change (e.g., guest-to-employee; one super-privilege level to another super-privilege level) may warrant a "suspicious" classification for increased surveillance, but does not rise to a "malicious" classification as the enhanced privileges fail to provide additional access to sensitive information within the endpoint or stored within the enterprise. Similarly, a major privilege change (e.g., employee-to-administrator; employee-to-super-privilege) may warrant a "malicious" classification as the enhanced privileges may provide the user with substantial increased access sensitive information within the endpoint or stored within the enterprise.

Once the analysis logic 210, operating in accordance with the privilege escalation rules 460, determines that a detected privilege escalation represented by the detection message 400 is malicious, the user mode agent 140 may initiate an alert 470 to the endpoint user or an administrator as to the detection of a privilege escalation attack (operation 22). Furthermore, besides the alert 470, the user mode agent 140 may terminate and/or quarantine the malicious monitored process.

In contrast, where the analysis logic 210 determines that the detected privilege escalation is suspicious, the user mode agent 140 may initiate an event acquisition message 480 to the kernel mode driver 150 to acquire additional events associated with the monitored process for evaluation (operation 23). As the kernel mode agent 150 publishes the subsequent events (such as, for example, access using the escalated privilege to a privileged and highly sensitive file or attempted outbound transfer of data (exfiltration) from that file) to the user mode agent 140, the user mode agent 140, operating in accordance with the privilege escalation rules, may identify further suspicious or malicious activity. The suspicious determination (described above) along with these additional results may be weighted, and collectively, may prompt the analysis logic 210 of the user mode agent 140 to determine a malicious verdict or a benign verdict.

Figure 5:
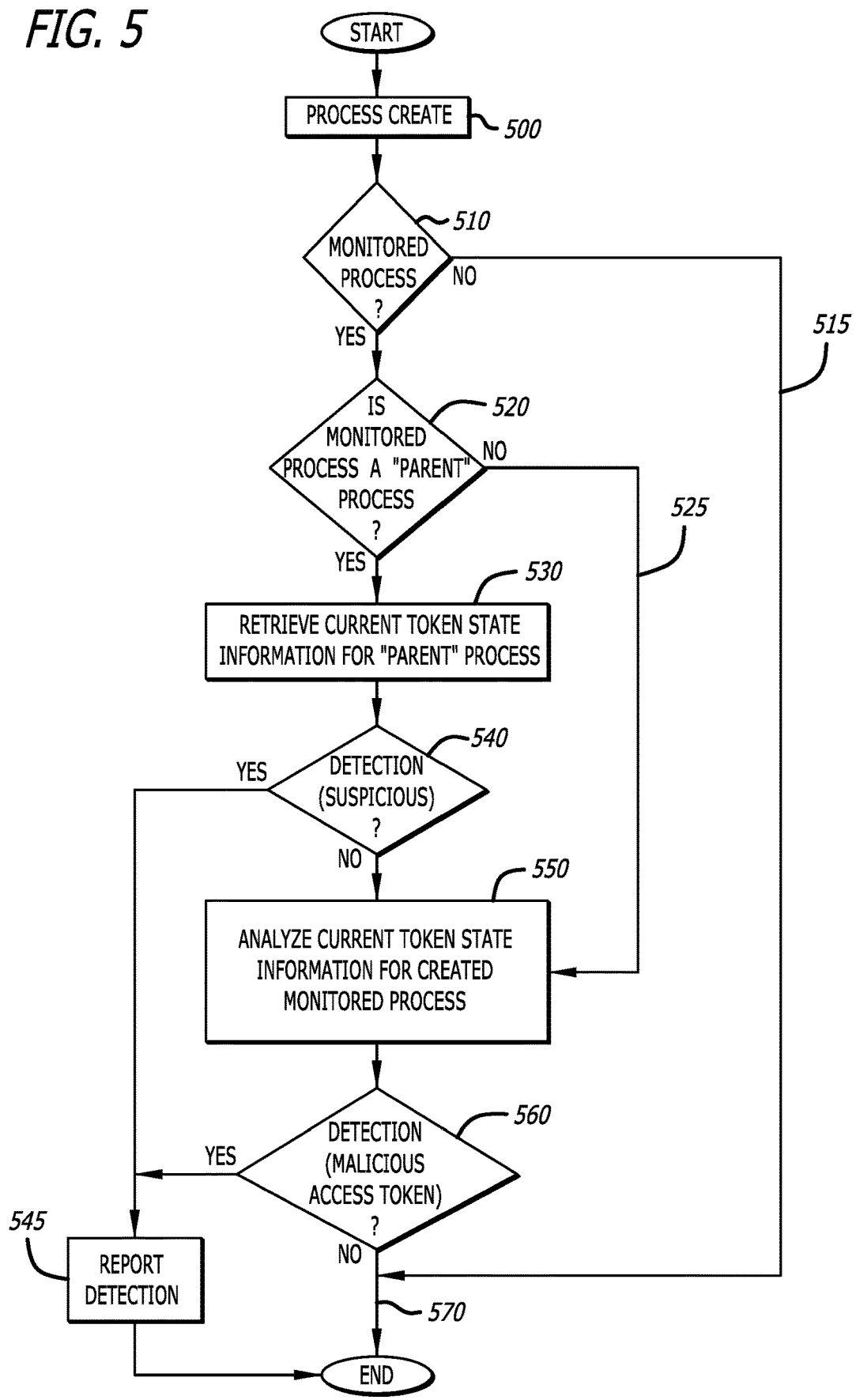
FIG. 5 is an exemplary embodiment of a flowchart illustrating operations conducted by the kernel mode driver of FIG. 2 in detecting a privilege escalation.

Referring to FIG. 5, an exemplary embodiment of a flowchart illustrating operations of the token analysis system 110 of FIG. 2 in analysis of a process creation event for a monitored process is shown. Responsive to receiving a callback message directed to creation of a monitored process (block 500), the kernel mode driver determines or confirms that the process is a process selected for monitoring for token privilege escalation (operation 510). Where the process is not to be monitored, the kernel mode driver ignores the process (operation 515). However, where the process is a process to be monitored, the kernel mode driver provides the content associated with the monitored process to the event analysis logic 250 that performs the token privilege escalation detection. From the content, the kernel mode driver attempts to verify whether the monitored process is a "parent" process (operation 520). Stated differently, the kernel mode driver determines whether the monitored process is created from another process (i.e., a "child" process) or not.

In the event that the monitored process is a first process (i.e., a "parent" process) the kernel mode driver analyzes the current token state information associated with the access token for the created, monitored parent process (operations 525 and 550). However, where the monitored process is a "child" process, namely the monitored process is a secondary process created from another process, the kernel mode driver retrieves and analyzes the current token state information associated with the access token for the parent process (operations 530 and 540), which, by inherence, is also associated with the child process. If a privilege escalation is detected for the parent process, the detected privilege escalation of the child process is reported to the user mode agent (operation 545). However, if no privilege escalation is detected for the parent process, the kernel mode driver analyzes the current token state information associated with the access token for the created (child) process (operations 540 and 550), since the access token for the child process may have been changed by a user after created. If a privilege escalation is detected for the child process, the detected privilege escalation is reported to the user mode agent (operations 545 and 560). However, if no privilege escalation is detected for the monitored process, the kernel mode driver refrains from reporting information associated with the monitored process to the user model agent (operations 560 and 570).

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for detecting and mitigating a privilege escalation attack on an electronic device, the method comprising:
   storing metadata for an access token, by a kernel mode driver, in response to an event occurring before or during a launch of a process being monitored, the stored metadata comprises stored token state information including content to provide access to at least a first set of privileges for a user associated with the access token;
   responsive to detecting an event associated with the process being monitored, extracting at least a portion of current token state information for the access token by the kernel mode driver and comparing at least the portion of the current token state information to at least a portion of the stored token state information;
   determining whether the access token has been changed legitimately by a software function that, upon execution, is permitted to change the access token;
   detecting a privilege escalation attack in response to a variation between at least the portion of the current token state information and at least the portion of the stored token state information when the access token has not been changed legitimately, wherein the detecting of the privilege escalation attack being conducted by a user mode agent in response to determining a prescribed threat level of a detected privilege escalation based on (i) a difference between a pointer to a data structure of the access token included in the current token state information and a pointer to the data structure of the access token included in the stored token state information, or (ii) a difference between a user identifier included in the current token state information and a user identifier included in the stored token state information, or (iii) a difference between a set of privileges associated with the access token obtained via the pointer to the data structure of the access token included in the current token state information and the first set of privileges; and
   revising the stored token state information when the access token has been changed legitimately.

2. The computerized method of claim 1, wherein the storing of the stored token state information is in response to the launch of the process being monitored.

3. The computerized method of claim 2, wherein prior to detecting the launch of the process, the method further comprising:
   receiving a listing of monitored processes by the kernel mode driver.

4. The computerized method of claim 3, wherein the listing of monitored processes is provided from the user mode agent to the kernel mode driver, the listing of monitored processes being modifiable depending on a current threat landscape to which the electronic device is exposed.

5. The computerized method of claim 3, wherein prior to detecting the launch activation of the process and after receiving the listing of monitored processes, the method further comprising:
   subscribing, by the kernel mode driver, to an operating system of the electronic device to receive information associated with events for one or more processes within the listing of the monitored processes.

6. The computerized method of claim 5, wherein prior to detecting the launch of the process and after receiving the listing of monitored processes, the method further comprising:
   issuing, by the kernel mode driver, a request message via an Application Programming Interface (API) to an operating system of the electronic device to receive information associated with events for a first process within the listing of the monitored processes; and
   receiving a response message from the operating system in response to the first process being launched.

7. The computerized method of claim 6, wherein the request message includes the stored token state information providing access to the first set of privileges for the user.

8. The computerized method of claim 6, wherein the response message includes the stored token state information that comprises a pointer to a data structure associated with the access token including the first set of privileges and an identifier of the user associated with the access token.

9. The computerized method of claim 8, wherein the detecting of the privilege escalation attack is based, at least in part, on detecting the pointer to the data structure associated with the access token being different from a pointer to a data structure for the access token provided by the extracted portion of the current token state information.

10. The computerized method of claim 8, wherein the detecting of the privilege escalation attack is based, at least in part, on detecting the identifier of the user included in the data structure associated with the access token being different from a user identifier within the data structure for the access token provided by the extracted portion of the current token state information.

11. The computerized method of claim 7, wherein the detecting of the privilege escalation attack is based on detected changes between (i) parameter values of the access token obtained from the portion of current token state information for the access token and (ii) corresponding parameter values from the first set of privileges for the user associated with the access token.

12. The computerized method of claim 1, wherein the user mode agent corresponds to a software agent deployed within a user space of the electronic device.

13. The computerized method of claim 1, wherein the detecting of the privilege escalation attack being conducted by the user mode agent in response to analysis of information within a message provided to the user mode agent by the kernel mode driver, the message includes (i) information that identifies the process being monitored, (ii) information that identifies the event, and (iii) information that identifies a change between the portion of the stored token state information and the portion of the current token state information.

14. The computerized method of claim 1, wherein the information that identifies the change between the portion of the stored token state information and the portion of the current token state information comprises (i) any difference between the pointer to the data structure of the access token included in the current token state information and the pointer to the data structure of the access token included in the stored token state information, (ii) any difference between the user identifier included in the current token state information and the user identifier included in the stored token state information, and (iii) any difference between the set of privileges associated with the access token obtained via the pointer to the data structure of the access token included in the current token state information and the first set of privileges.

15. The electronic device of claim 14, wherein the kernel mode driver, when executed by the processor, to detect the privilege escalation attack being based, at least in part, on detecting the pointer to the data structure associated with the access token being different than the pointer to the data structure for the access token provided by the extracted portion of the current token state information.

16. The electronic device of claim 14, wherein the kernel mode driver, when executed by the processor, to detect the privilege escalation attack is based, at least in part, on detecting the identifier of the user included in the data structure associated with the access token being different from a user identifier within a data structure for the access token provided by the extracted portion of the current token state information.

17. The electronic device of claim 14, wherein the user mode agent to detect the privilege escalation attack by at least detecting changes between (i) values of the access token obtained from the extracted portion of the current token state information and (ii) corresponding values from the stored token state information.

18. The electronic device of claim 14, wherein the user mode agent to detect the privilege escalation attack in response to at least determining a prescribed threat level of a detected privilege escalation based on (i) a difference between the pointer to a data structure of the access token included in the current state information and the pointer to the data structure of the access token included in the stored token state information, or (ii) a difference between the user identifier included in the current token state information and the user identifier included in the stored token state information.

19. The electronic device of claim 14, wherein the information that identifies the variation between at least the portion of the current token state information and at least the portion of the stored token state information comprises (i) any difference between the pointer to the data structure of the access token included in the current token state information and the pointer to the data structure of the access token included in the stored token state information, (ii) any difference between the user identifier included in the current token state information and the user identifier included in the stored token state information, and (iii) any difference between the set of privileges associated with the access token obtained via the pointer to the data structure of the access token included in the current token state information and the first set of privileges.

20. An electronic device, comprising:
a processor; and
a memory communicatively coupled to the processor, the memory includes a user mode agent and a kernel mode driver, wherein
the kernel mode driver, when executed by the processor, to (i) store metadata for an access token prior to or during a launch of a process being monitored, the stored metadata comprises stored token state information including content to provide access to at least a first set of privileges for a user associated with the access token, (ii) extract at least a portion of current token state information for the access token in response to detecting an event associated with the process being monitored, (iii) compare at least the portion of the current token state information to at least a portion of the stored token state information, (iv) upon the compare identifies a change to at least the portion of the current token state information, determine whether the access token has been changed legitimately by a software function that, upon execution, is permitted to change the access token and revise the stored token state information for the access token if the access token has been changed legitimately, and
the user mode agent, when executed by the processor, to detect a privilege escalation attack in response to a variation between at least the portion of the current token state information and at least the portion of the stored token state information, wherein the variation includes at least (i) a difference between a pointer to a data structure of the access token included in the current token state information and a pointer to the data structure of the access token included in the stored token state information, or (ii) a difference between a user identifier included in the current token state information and a user identifier included in the stored token state information, or (iii) a difference between a set of privileges associated with the access token obtained via the pointer to the data structure of the access token included in the current token state information and the first set of privileges.

21. The electronic device of claim 20, wherein the kernel mode driver being configured to receive a listing of monitored processes by the kernel mode driver.

22. The electronic device of claim 21, wherein user mode agent being configured to provide the listing of monitored processes to the kernel mode driver, the listing of monitored processes being modifiable depending on a current threat landscape to which the electronic device is exposed.

23. The electronic device of claim 21, wherein the kernel mode driver to subscribe to an operating system of the electronic device to receive information associated with events for one or more processes within the listing of the monitored processes.

24. The electronic device of claim 23, wherein the kernel mode driver to issue a request message via an Application Programming Interface (API) to an operating system of the electronic device to receive information associated with events for a first process within the listing of the monitored processes and receive a response message from the operating system in response to the first process being launched.

25. The electronic device of claim 20, wherein the request message issued by the kernel mode driver includes the stored token state information providing access to the first set of privileges for the user.

26. The electronic device of claim 25, wherein the response message received by the kernel mode driver includes the stored token state information that comprises the pointer to the data structure associated with the access token including the first set of privileges and an identifier of the user associated with the access token.

27. A non-transitory computer readable medium including software that, when executed by the processor, performs operations comprising:

storing token state information associated with an access token in response to an event occurring before or during a launch of a process being monitored, the stored token state information including content to provide access to at least a first set of privileges for a user associated with the access token;

responsive to detecting an event associated with the process being monitored, extracting at least a portion of current token state information for the access token and comparing at least the portion of the current token state information to at least a portion of the stored token state information;

determining whether the access token has been changed legitimately by a software function that, upon execution, is permitted to change the access token;

revising the stored token state information when the access token has been changed legitimately; and detecting a privilege escalation attack in response to a variation between at least the portion of the current token state information and at least the portion of the stored token state information when the access token has not been changed legitimately, wherein the variation includes at least (i) a difference between a pointer to a data structure of the access token included in the current state information and a pointer to the data structure of the access token included in the token state information, or (ii) a difference between a user identifier included in the current state information and a user identifier included in the token state information, or (iii) a difference between a set of privileges associated with the access token obtained via the pointer to the data structure of the access token included in the current state information and the first set of privileges.

* * * * *